(12) United States Patent
Cao et al.

(10) Patent No.: US 12,209,568 B2
(45) Date of Patent: Jan. 28, 2025

(54) HYBRID WAVE ENERGY CONVERTER AND MARINE BUOY SYSTEM FOR WAVE ENERGY HARVESTING AND MARINE SENSING

(71) Applicant: CASE WESTERN RESERVE UNIVERSITY, Cleveland, OH (US)

(72) Inventors: Changyong Cao, Okemos, MI (US); Yuhui Fang, Okemos, MI (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 0 days.

(21) Appl. No.: 18/513,520

(22) Filed: Nov. 18, 2023

(65) Prior Publication Data

US 2024/0167449 A1    May 23, 2024

Related U.S. Application Data

(60) Provisional application No. 63/384,323, filed on Nov. 18, 2022.

(51) Int. Cl.
    *F03B 13/20* (2006.01)

(52) U.S. Cl.
    CPC .................................. *F03B 13/20* (2013.01)

(58) Field of Classification Search
    CPC ....................................................... F03B 13/20
    See application file for complete search history.

(56) References Cited

U.S. PATENT DOCUMENTS

| | | | | |
|---|---|---|---|---|
| 8,022,563 | B2* | 9/2011 | Lemieux | F03B 13/20 290/1 R |
| 9,543,860 | B2* | 1/2017 | Wang | H02N 1/04 |
| 9,571,009 | B2* | 2/2017 | Wang | H02N 1/04 |
| 10,333,430 | B2* | 6/2019 | Wang | F03B 13/14 |
| 10,574,155 | B2* | 2/2020 | Song | H02N 1/04 |
| 11,545,915 | B2* | 1/2023 | Cao | H02N 11/002 |
| 11,913,421 | B2* | 2/2024 | Jiao | F03B 13/20 |
| 2016/0040648 | A1* | 2/2016 | Wang | H02H 1/04 290/42 |
| 2021/0211072 | A1* | 7/2021 | Cao | H02N 1/10 |
| 2022/0307458 | A1* | 9/2022 | Jiao | H02J 15/003 |

OTHER PUBLICATIONS

Guo et al., "A Water-Proof Triboelectric-Electromagnetic Hybrid Generator for Energy Harvesting in Harsh Environments", Dec. 23, 2015, Wiley Advanced Energy Materials. (Year: 2015).*
Wu et al., "A Hybridized Triboelectric-Electromagnetic Water Wave Energy Harvester Based on a Magnetic Sphere", Jan. 25, 2019, ACS Publications, pp. 2349-2356. (Year: 2019).*
Pang et al., "Hybrid Energy-Harvesting Systems Based on Triboelectric Nanogenerators", Jan. 6, 2021, Elsevier Matter 4, pp. 116-143. (Year: 2021).*
Guan et al., "Quantitative characterization of the energy harvesting performance of soft-contact sphere triboelectric nanogenerator", May 24, 2021, Elsevier Nano Energy. (Year: 2021).*

* cited by examiner

*Primary Examiner* — Tulsidas C Patel
*Assistant Examiner* — Thomas K Quigley
(74) *Attorney, Agent, or Firm* — Tarolli, Sundheim, Covell & Tummino LLP

(57) ABSTRACT

A triboelectric-electromagnetic hybrid nanogenerator (TEHG) includes a ball-based triboelectric nanogenerator (TENG) and an electromagnetic generator (EMG) configured to move due to exterior fluid movement to generate triboelectric and electromagnetic charging for harvesting wave energy.

9 Claims, 20 Drawing Sheets

HYBRID WAVE ENERGY CONVERTER AND MARINE BUOY SYSTEM FOR WAVE ENERGY HARVESTING AND MARINE SENSING

RELATED APPLICATION

This application claims priority from U.S. Provisional Application No. 63/384,323, filed Nov. 18, 2022, the subject matter of which is incorporated herein by reference in its entirety.

BACKGROUND

Ocean wave energy is one of the most promising renewable energy sources for large-scale applications since more than 70% of the Earth's surface is covered by the ocean. It refers to ocean surface waves' kinetic and potential energy. Compared with other renewable energies, such as solar power and wind energy, ocean wave energy has the superior advantages of high power density, wide distribution, and low dependency on daytime, weather, and season. It is estimated that ocean waves can generate at least 8,000 terawatt-hours of electricity per year if such energy can be harvested effectively. However, large-scale and efficient wave energy harvesting is still challenging due to the energy harvesters' low efficiency, high cost, and low frequency of ocean waves (<5 Hz).

Triboelectric nanogenerator (TENG), based on triboelectrification and electrostatic induction, has been extensively studied to harvest low-frequency mechanical energy, including wave energy. Previous studies have demonstrated that TENGs can effectively convert ocean wave energy into electrical output, with the merits of high output power, low cost, lightweight, case of fabrication, and abundant choices of materials. Various TENGs with different structures have been proposed for wave energy harvesting, including the rolling ball structure, multilayered structure, grating structure, pendulum structure, and mass-spring structure. Among these designs, the rolling ball structure is the most fundamental and typical design for wave energy harvesting due to its high buoyancy and low resistance to water wave motions. However, these rolling ball-based TENGs using a single rolling ball inside a spherical shell have a small contact area and charge density, resulting in a low energy harvesting efficiency.

SUMMARY

Embodiments described herein relate to a hybrid wave energy converter (WEC) and marine buoy system for wave energy harvesting and marine sensing, and particularly to a triboelectric-electromagnetic hybrid nanogenerator (TEHG) that includes a soft ball-based triboelectric nanogenerator (SB-TENG) and an electromagnetic generator (EMG) for harvesting low-frequency wave energy from arbitrary directions in a body of water, such as an ocean, sea, or lake.

In some embodiments, under an operating frequency of 1 Hz, the SB-TENG and the EMG can reach a maximum output peak power of 0.5 mW and 8.5 mW, respectively. In other embodiments, the output power of the TEHG can be, for example, about 10 W/m$^3$ to about 50 Wm$^3$ or about 100 mW/kg to about 1000 mW/kg. The TEHG has been demonstrated to power dozens of light-emitting diodes and drives a digital temperature sensor to monitor the water temperature for an extended period. The TEHG improves the output performance of TENGs and presents an improved self-powered system driven by low-frequency water waves.

In some embodiments, the TEHG can include a buoyant, waterproof, and enclosed shell. A plurality of cavities are provided within the shell and are defined by a plurality of substantially parallel dividers. The parallel dividers include an upper divider, a lower divider, and a plurality of middle dividers. Each middle divider includes a substantially planar upper surface, a substantially parallel lower surface and a set of spaced apart electrodes affixed to the upper surfaces of the middle dividers. A plurality of freely moveable chargers are located on the upper surfaces of the middle dividers. A conductive coil is positioned below the lower divider on a bottom interior surface of the shell. A freely moveable magnet is positioned on an upper surface of lower divider. The freely moveable triboelectric soft balls and stationary electrodes form the TENG, and the coil-magnet structure forms an EMG. Both functions have the function of wave energy harvesting by movement of the shell due to exterior fluid movement. Movement of the shell causes the chargers to move between the separated electrodes and the magnet across the upper surface of the lower divider and generate, respectively, triboelectric and electromagnetic charging.

In some embodiments, the chargers are negatively charged, the electrodes are positively charged, and movement of the chargers between separated electrodes on the middle dividers upon movement of the shell results in the generation of an alternating current. In some embodiments, upon movement of the shell, the magnet slides relative to the coil so that the coil cuts magnetic induction lines, inducing an electromagnetic current.

In some embodiments, the chargers can include moveable balls that are elastic and flexible to enhance contact with the electrodes.

In some embodiments, each of the moveable balls includes an outer silicone shell and a liquid polymer within the outer silicone shell.

In other embodiments, each of the moveable balls includes an outer surface that is coated with a polytetrafluoroethylene (PTFE) powder.

In some embodiments, the enclosed shell is substantially spherical, and the dividers are substantially circular in shape or disc shaped.

In other embodiments, the TEHG can include at least one electrical component. The electrical component can include, for example, a sensor, a light, a timer, a display, a power storage unit, or a transmission unit.

Still other embodiments relate to wave energy converter system that includes a plurality of TEHGs as described herein. Each of the plurality of TEHGs can include or be electrically connected to one another and/or at least one electrical component, such as a sensor, a light, a timer, a display, a power storage unit, or a transmission unit.

DETAILED DESCRIPTION

Embodiments described herein relate to a hybrid wave energy converter (WEC) and marine buoy system for wave energy harvesting and marine sensing, and particularly to a triboelectric-electromagnetic hybrid nanogenerator (TEHG) that includes a soft ball-based triboelectric nanogenerator (SB-TENG) and an electromagnetic generator (EMG) for harvesting low-frequency wave energy from arbitrary directions in a body of water, such as an ocean, sea, or lake. The SB-TENG can include triboelectric soft balls that are freely moveable between separated electrodes to provide a moving triboelectric layer. The soft balls can significantly increase contact area with electrodes of the SB-TENG compared to hard triboelectric materials to generate substantially more triboelectric charges. The EMG can include a magnet that is freely moveable relative to copper coils to induce an electromagnetic current.

Under the agitation of water waves, the soft balls and the magnet can simultaneously move back and forth to convert the water wave motions into electricity. For example, the shell can be configured to move due to exterior fluid movement, such as wave agitation, to move the soft balls between the separated electrodes and the magnet across the lower divider to generate, respectively, triboelectric and electromagnetic charging. In some embodiments, under an operating frequency of 1 Hz, the SB-TENG and the EMG can reach a maximum output peak power of 0.5 mW and 8.5 mW, respectively. In other embodiments, the output power of the TEHG can be, for example, about 10 $W/m^3$ to about 50 $Wm^3$ or about 100 mW/kg to about 1,000 mW/kg. The TEHG has been demonstrated to power dozens of light-emitting diodes and drives a digital temperature sensor to monitor the water temperature for an extended period. The TEHG improves the output performance of TENGs and presents an improved self-powered water-sensing system driven by low-frequency water waves.

Figure 1A:
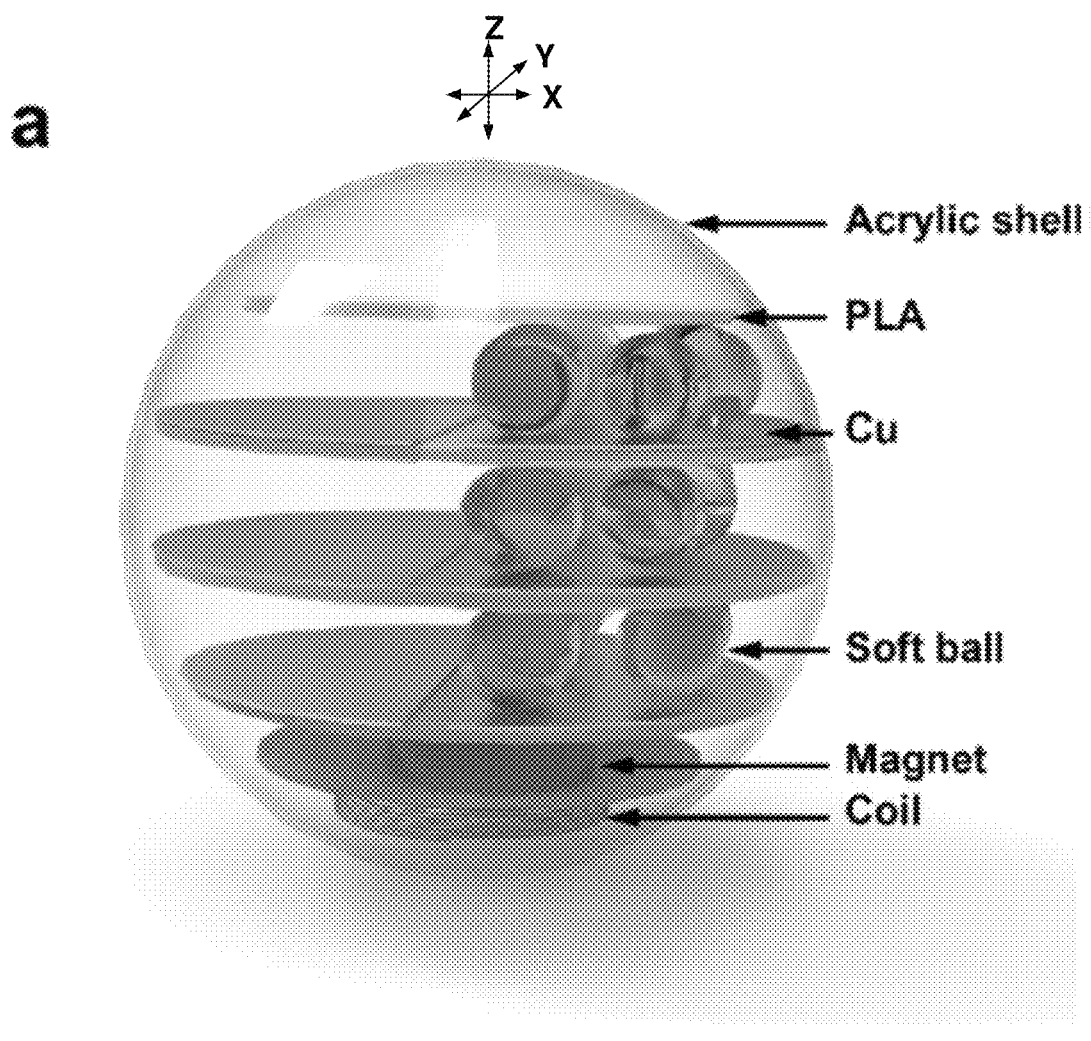
FIGS. 1(A-E) illustrate prototype design and working principle of the triboelectric-electromagnetic hybrid generator (TEHG). (A) Schematic illustration of the concept design for TEHG, consisting of soft ball-based TENGs (SB-TENG) and electromagnetic generator (EMG). Multiple soft balls are filled in the cavities formed by the layered structures in a spherical acrylic shell. (B, C) Photographs of soft balls made of an Eco-flex 30 shell filled with liquid materials. The soft balls can generate a larger contact area with the copper electrodes. (D) The schematic illustration of the working principle of the SB-TENG. (E) The schematic illustration of the working principle of the EMG.
Figure 1B:
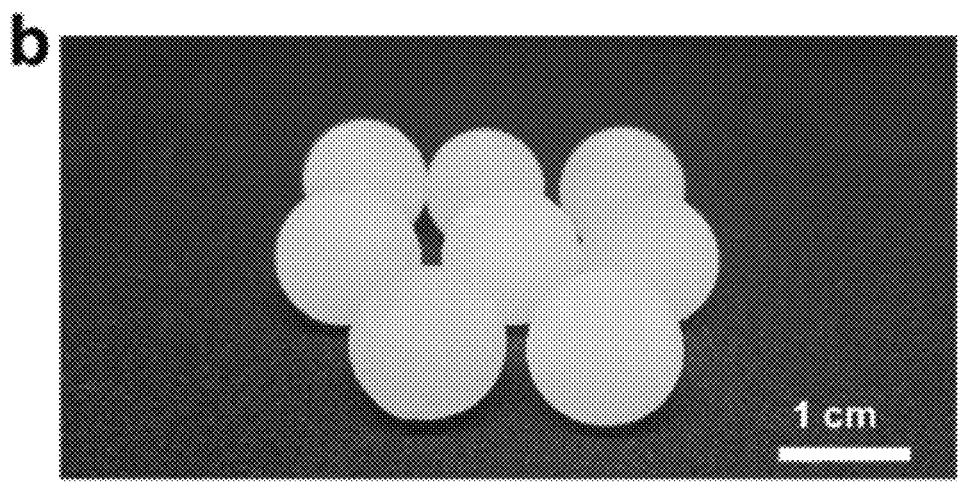
Figure 2A:
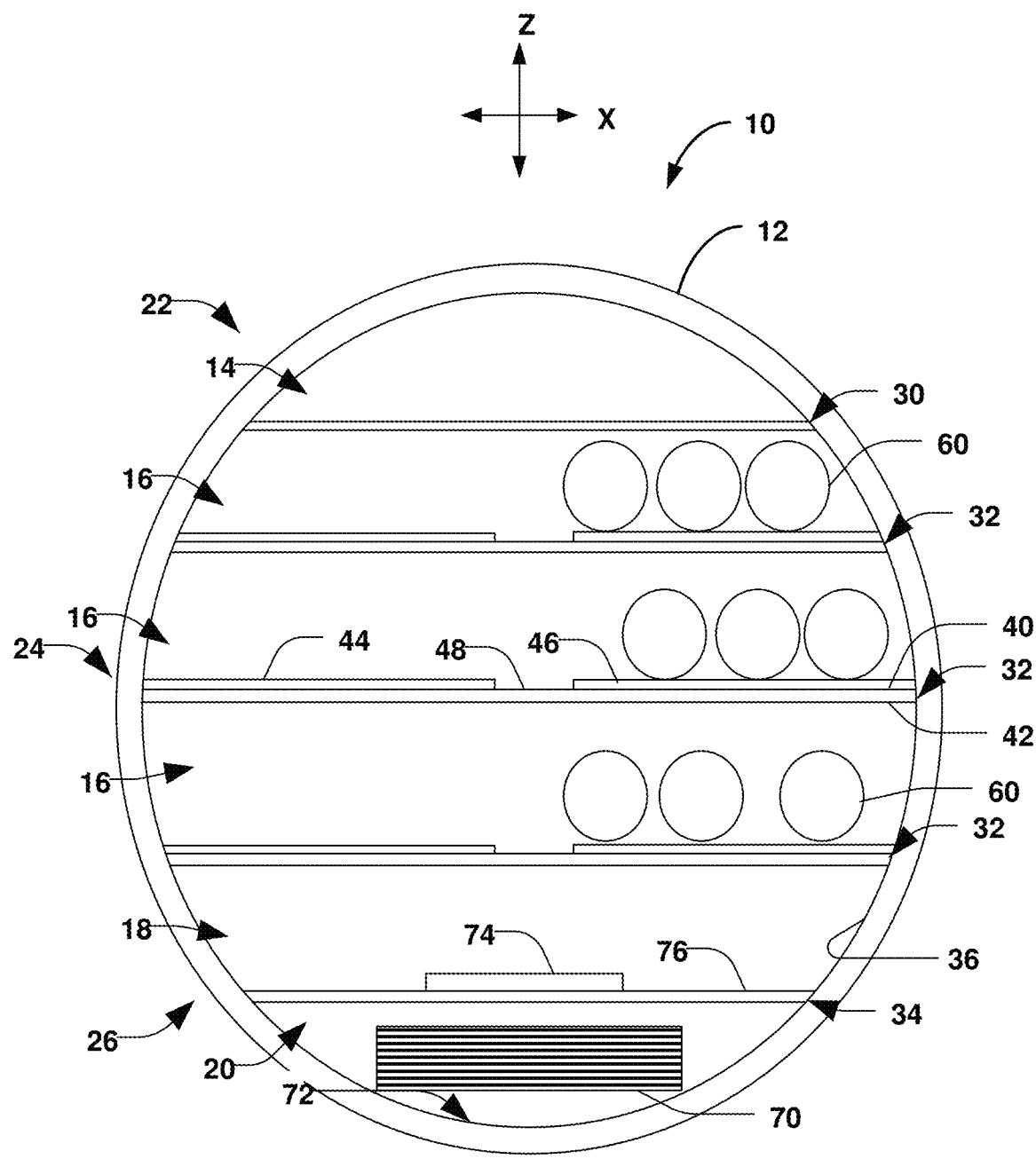
FIGS. 2(A-B) illustrate: (A) a cross-sectional view of the TEHG and (B) a schematic view of a middle divider of the TEHG.

FIGS. 1A and 2A illustrate respectively a schematic drawing and cross-sectional view of a TEHG 10 that can be used for energy harvesting ocean or lake water waves in accordance with an embodiment. The TEHG 10 includes a buoyant, waterproof and enclosed shell 12 and a plurality of stacked cavities 14, 16, 18, 20 within the shell 12. The shell 12 can have a substantially spherical shape although polygonal, ovular, curved, or other enclosed shapes can be employed. The shell 12 can include an upper portion 22, middle portion 24, and lower portion 26. The upper portion 22, middle portion 24, and lower portion 26 can extend or be arranged along z-axis of an x-y-z coordinate system. The shell 12 can be formed from a substantially rigid waterproof material, such as an acrylic and have a diameter of about 100 mm to about 10 m, for example about 100 mm to about 1 m. Optionally, the shell 12 can be waterproofed with a waterproof sealant, coating, or glue to avoid potential water leakage, which may affect the generator's energy harvesting performance.

The plurality of cavities 14, 16, 18, 20 within the shell 12 are defined by a plurality of substantially parallel circular or disc shaped dividers 30, 32, 34 that are spaced from one another along the z-axis and extend radially from the z axis to an inner surface 36 of the shell 12 and substantially parallel to an x-y plane of the x-y-z coordinate system. Each cavity 14, 16, 18, 20 can be defined by adjacent parallel dividers in the shell. The dividers can be formed from, for example, circular or disc shaped polylactic (PLA) sheets. The circular PLA sheets can be made as substrates by a 3D printer with the same thickness but different diameters.

The parallel dividers 30, 32, 34 include an upper divider 30 in the upper portion 22 that defines the upper cavity 14, a lower divider 34 in the lower portion 26 that defines lower cavities 18, 20, and a plurality of middle dividers 32 in the middle portion 24 that defines middle cavities 16. Although FIGS. 1A and 2A illustrate a shell 12 that includes three middle cavities 16, it will be appreciated that the shell 12 can include more or less middle cavities 16 depending on the number and spacing of the middle dividers 32.

Figure 2B:
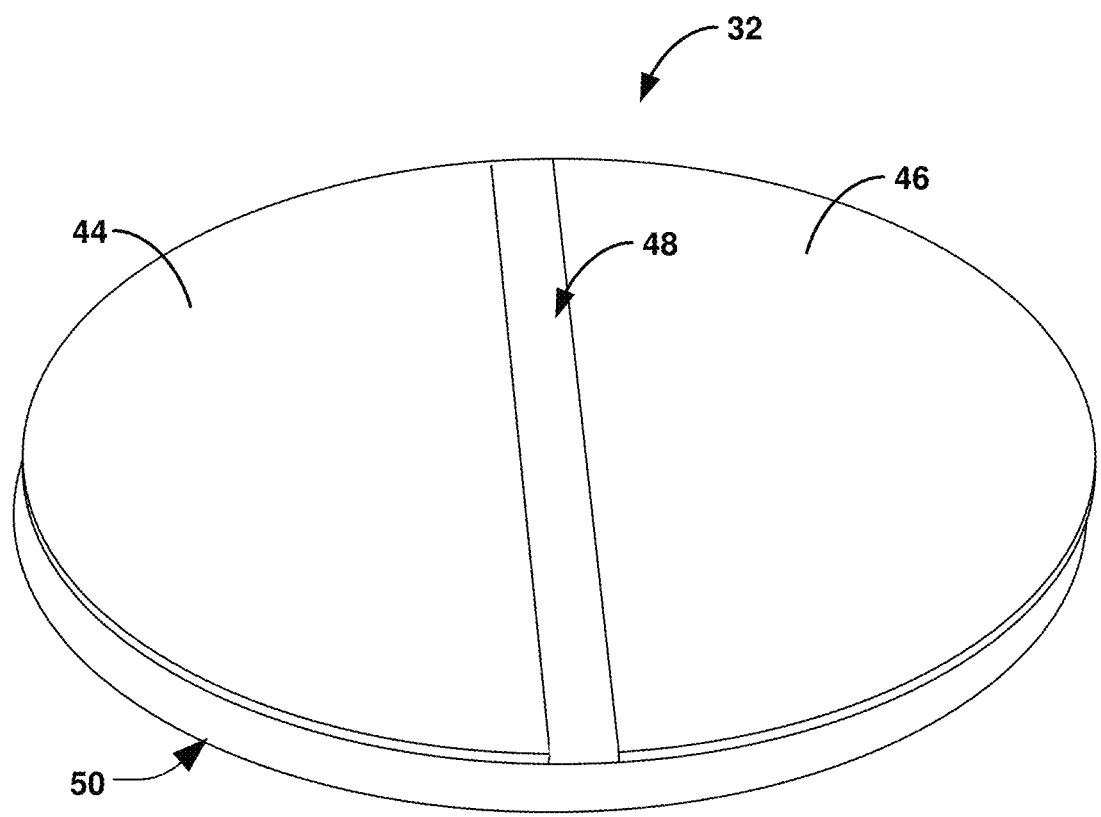

Each middle divider 32 includes an upper surface 40, a substantially parallel lower surface 42 and a set of spaced apart electrodes 44, 46 affixed to the upper surfaces 40 of the middle dividers 32. As illustrated in FIG. 2B, which is a top-plan schematic view of a middle divider 31, the spaced apart electrodes 44, 46 can have semi-circular shapes that are separated from one another by a gap 48 that extends between the electrodes 44, 46. However, it is alternately envisioned that each middle divider 32 may instead contain multiple alternating pairs of electrodes, such as four or six that are separated from one another on the upper surfaces 40 of the middle dividers 32. The electrodes 44, 46 can be formed by affixing or depositing a conductive material on a substrate 50 that forms the middle divider 32. By way of example, the spaced apart electrodes 44, 46 can be formed from two flat copper or copper alloy conductive tapes that are bonded onto the surface of a PLA sheet as fixed triboelectric layers and conductive electrodes 44, 46. The two spaced apart electrodes 44, 46 can be separated with a gap 48 of, for example, about 1 mm.

Each middle cavity 16 defined by the middle dividers 32 includes a plurality of freely moveable chargers 60, such as freely moveable triboelectric soft balls 60, located on the upper surface 40 of each middle divider 32. The soft balls 60 can freely move or roll back and forth on top of electrodes 44, 46 and over gap 48 on the middle dividers 32 driven by small wave agitations. The chargers or soft balls 60 are negatively charged and the electrodes 44, 46 are positively charged and the movement of the chargers 60 between separated electrodes 44, 46 upon movement of the shell result in the generation of an alternating current. These freely moveable triboelectric soft balls 60 and stationary electrodes 44, 46 form the SB-TENG, which has the function of wave energy harvesting.

The freely moveable soft balls 60 are elastic and flexible to enhance contact with the electrodes 44, 46. The SB-TENG described herein includes multiple soft balls 60 within each middle cavity 16. For example, at least three and more preferably at least six soft balls 16 are provided in each middle cavity. The multiple balls 60 for each middle cavity can have superior output performance as compared to a single ball of the same size. In some embodiments, the number of soft balls provided on each middle divider 32 or arranged in each middle cavity 16 can vary depending on the size of the balls or cavity typically at least 2, 3, 4, 5, 6, 7, 8, or more balls are provided in each middle cavity 16.

Figure 1C:
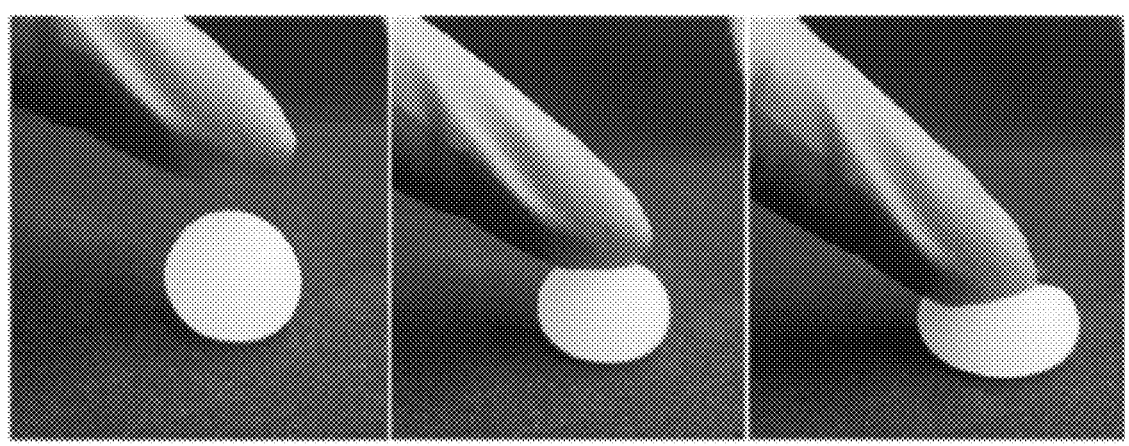

Each of the moveable soft balls 60 can include an outer shell and a diameter that allows the soft balls to roll back and forth along a middle divider in a respective middle cavity between the electrodes. For example, the moveable soft balls 60 can have a diameter of, for example, about 10 mm to about 20 mm, or about 12 mm. The shell can be formed of a negative triboelectric material, such as a silicone material, e.g., Ecoflex. For example, the soft balls can be made of a silicone rubber (e.g., Ecoflex-30) and can deform when pressed with a small force (FIG. 1c).

Advantageously, the shell thickness can be minimized to enhance the SB-TENG output voltage. For the shell of the soft balls can have a thickness of about 100 μm to about 10 mm depending on the size of the soft ball. It was found that the output voltage of the SB-TENG decreases with the thickness of the silicone rubber shell. This difference should be due to the smaller contact area between the soft ball with a thicker shell and the electrodes. Although the thickness of the soft shell can be further reduced, its robustness will decrease, and the damping force will increase significantly.

The outer shell of soft balls can define an internal cavity that can be filled with a liquid. Filling the soft ball with a liquid can allow the soft ball to generate more considerable deformation and contact area to improve the electricity generation of the TENG. In some embodiments, the liquid used to fill the soft ball can include a liquid polymer without free ions, such as Ecoflex or lubricating oil. Advantageously, a liquid polymer without free ions does not adversely affect the generation of contact electrification charges on the electrode.

Figure 3A:
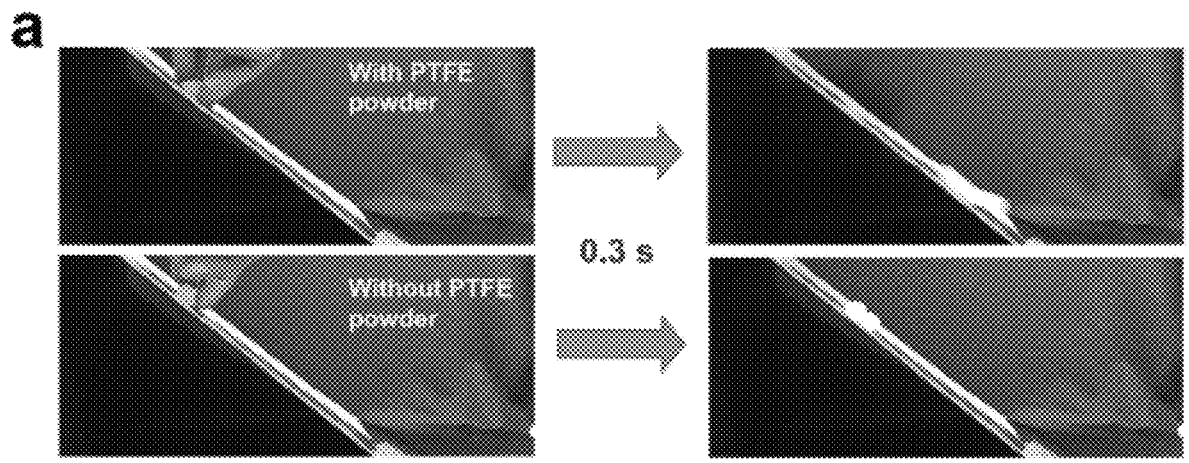
FIGS. 3(A-H) illustrate the effect of the critical factors of the SB-TENG on its energy harvesting performance. (A) Photographs of the soft balls with and without PTFE powder rolling on a tilted Cu surface. (B) Open-circuit voltage and transferred charge of the SB-TENG using two soft balls with and without PTFE powder. (C) Variation of the induced voltage with the types of the filled liquid. (D) Variation of the transferred charge with the types of the filled liquid. (E) The stability of the SB-TENG's harvesting performance varies with the types of the filled liquids. (F) Open-circuit voltage of the SB-TENG varies with the thickness of the soft balls. The insets show the photographs of the soft balls having different shell thicknesses. (G) Variation of the open-circuit voltage of the TENG when using different number of soft balls and rigid PTFE balls. (H) The open-circuit voltage of the SB-TENG as a function of the number of PLA layers.

In some embodiments, each of the moveable soft balls can be coated with a polytetrafluoroethylene (PTFE) powder on an outer surface of the soft balls to reduce the damping force but simultaneously enhance contact electrification. As shown in FIG. 3a, the soft balls with PTFE powders are less sticky and can roll off fast on an inclined Cu surface. In contrast, the soft balls without PTFE powders are very sticky, and the large damping force prevents them from rolling off the inclined Cu surface. In some embodiments, the PTFE powders are adsorbed on the surface of the soft balls when highly sticky silicone rubber is used to form the soft balls.

A conductive coil 70, such as a conductive copper coil with a circular pattern, is positioned in the lower cavity 20 below the lower divider 34 on a bottom interior surface 72 of the lower portion 26 of the shell 12. A circular magnet 74 is positioned on an upper surface 76 of the lower divider 34 above the conductive coil 70 in the other lower cavity 18 of the lower portion 26 of the shell 12. The circular magnet 74 is freely moveable on the upper surface 76 of the lower divider 34. Upon movement of the shell 12, the circular magnet 74 slides relative to the coil 70 so that the coil 70 cuts magnetic induction lines, inducing an electromagnetic current. This coil-magnet structure forms an EMG, which has the function of wave energy harvesting and lowers the TEHG's center of gravity to prevent possible overturning.

Figure 1D:
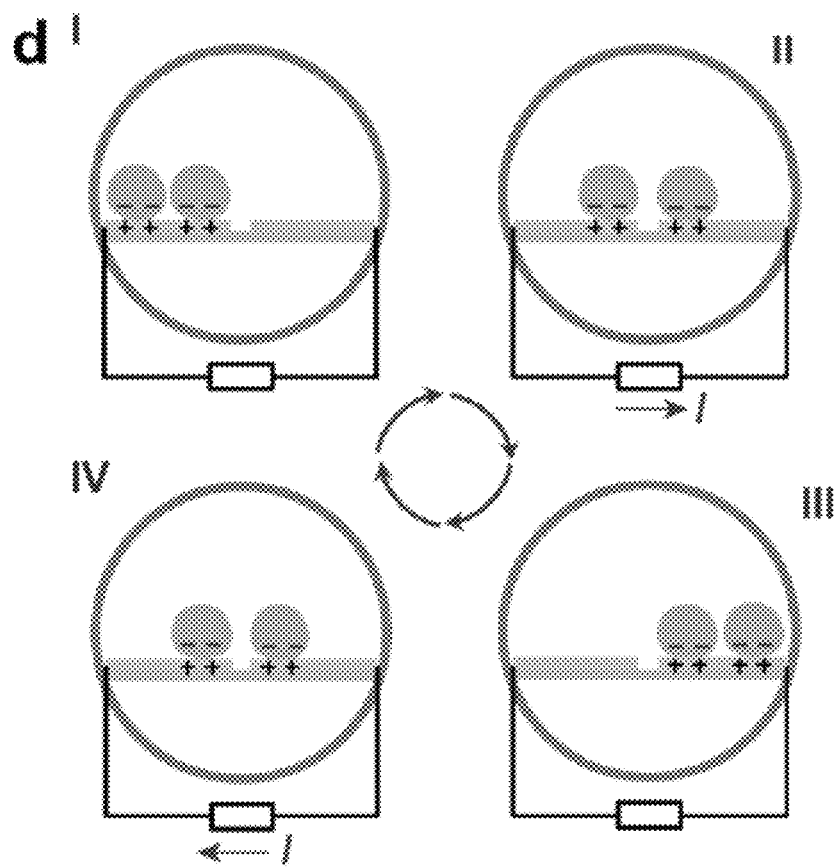
Figure 1E:
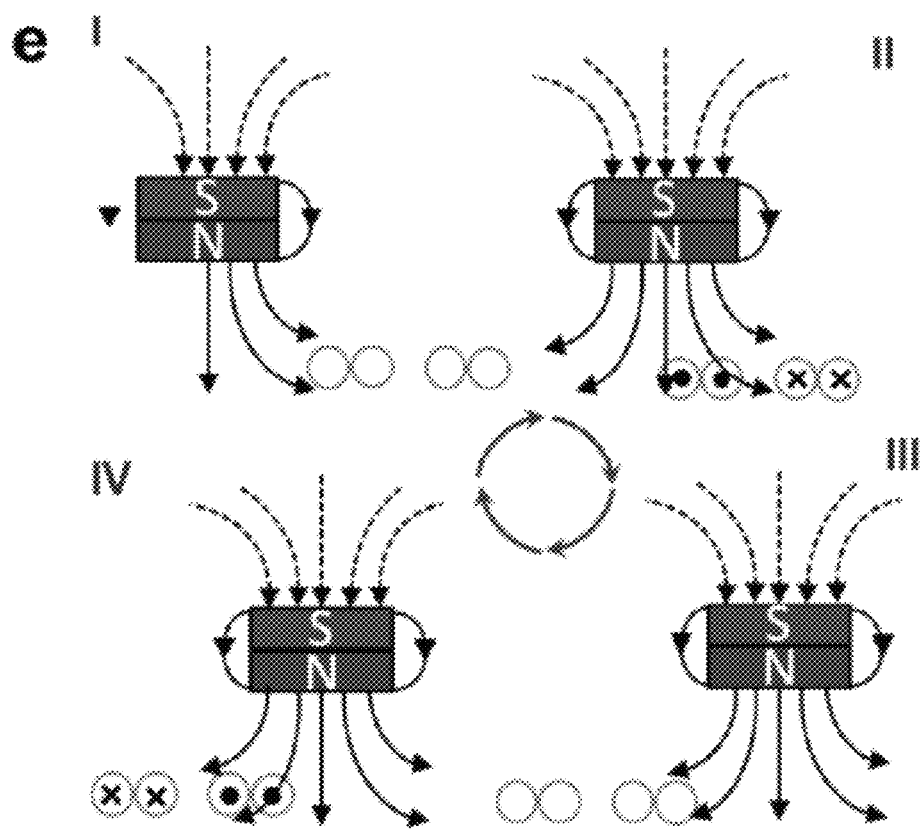

FIG. 1d shows the working principle of the SB-TENG unit, which is based on the conjugation of triboelectrification and electrostatic induction. When actuated by small wave agitations, the soft balls in the cavities of the SB-TENG will freely move or roll back and forth between the two electrodes, resulting in an alternating current through an external circuit. In brief, at the initial state (FIG. 1D <II>), when the soft balls are in contact with the left-hand electrode, the soft balls are negatively charged. In contrast, the electrode has the same number of positive charges in the saturated state due to its different abilities to attract electrons. At this moment, the tribo-charges will remain on the surfaces of the two triboelectric layers for an extended period. When the soft balls roll to the right-hand electrode under the wave agitations, the equilibration of the electric field will be changed so that the free electrons flow from the right-hand electrode to the left-hand electrode, resulting in a forward current in the external load (FIG. 1D <II>). When the soft balls leave the left-hand electrode and contact the right-hand electrode, all the positive charges on the left-hand electrode will be driven to the right-hand electrode (FIG. 1D <III>). After that, the soft balls will move back to their original positions, and the free electrons flow back to the right-hand electrode, generating a reverse current in the external load (FIG. 1D <IV>). FIG. 1e illustrates the working mechanism of the EMG unit, which is based on electromagnetic induction. Under the wave agitation, the magnet slides right-left with the coil so that the coils cut magnetic induction lines, inducting an electromagnetic current. With the cyclic motions of the magnet, alternating electricity will be generated continuously in the coil.

Figure 5A:
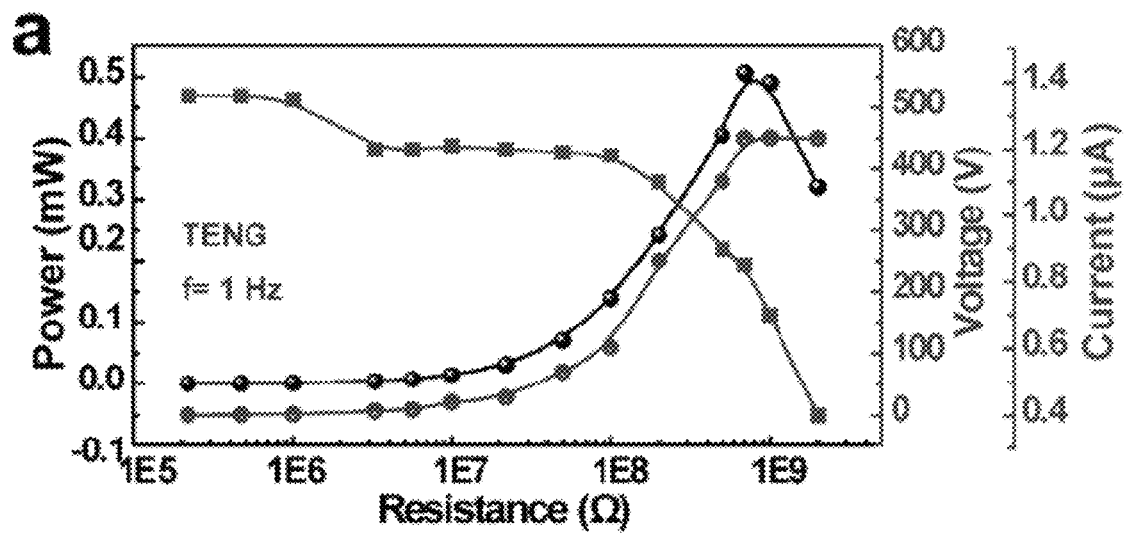
FIGS. 5(A-H) illustrate energy harvesting performance the TEHG and a self-powered sensing system. (A) Output power, current, and voltage of the SB-TENG vary with the external resistance loading. (B) Output power, current, and voltage of the EMG vary with the external resistance loading. (C) The charging curves of a capacitor (10 μF) powered by an SB-TENG, EMG, and TEHG, respectively. (D) The charging curves of a capacitor (10 μF) powered by a TEHG at different excitation frequencies. (E) The charging curves of different capacitors by a TEHG excited at 1.0 Hz. (F) The photographs of a TEHG lighten dozens of LEDs. (G) Schematic diagram of the management circuit for a self-powered sensing system. (H) The charging and discharging processes of a capacitor (100 μF) to drive a temperature sensor by a TEHG. The insets show the photographs of the TEHG and the thermometer.
Figure 5B:
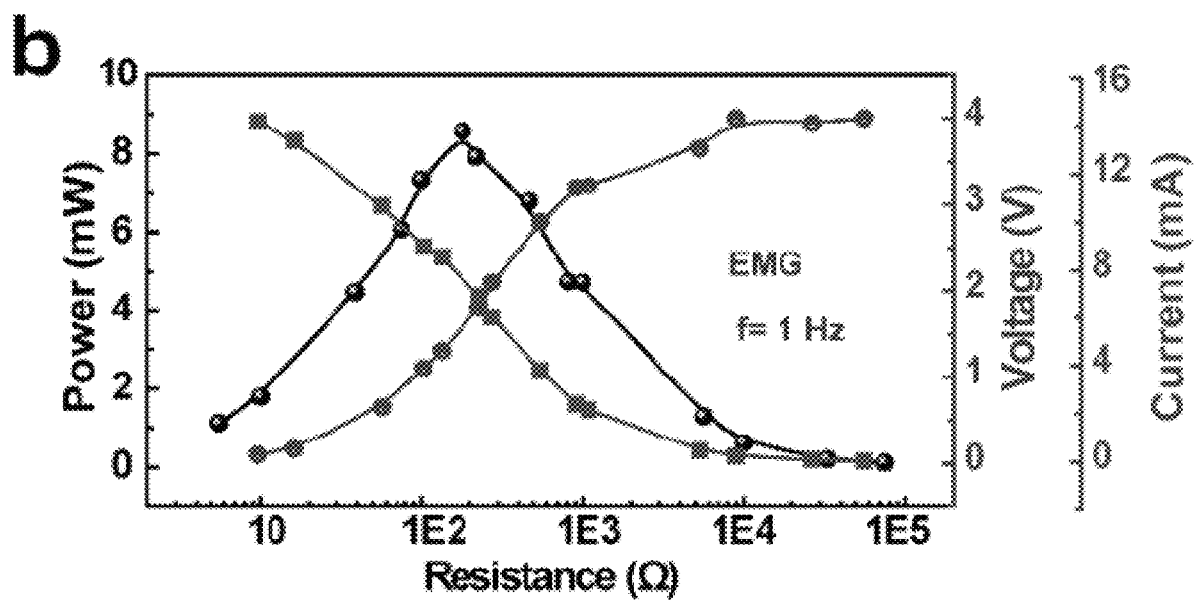

The TEHG harvests mechanical energy to charge energy storage unit and power electronics, forming a self-powered electronics system. The energy harvesting performance of TENGs is dependent on the external resistor loading. As shown in FIGS. 5A and 5B, the output voltages of the SB-TENG and the EMG increase with the increasing resistance loads while the output currents exhibit a reverse trend. It was found that when the external resistance is 700 MΩ, the SB-TENG reaches a peak power of 0.5 mW, while the EMG has a peak power of 8.6 mW at a load resistance of 180Ω. The above results indicate that SB-TENG can be regarded as a current source with a high impedance, whereas the EMG is equal to a voltage source with a low impedance.

Figure 5C:
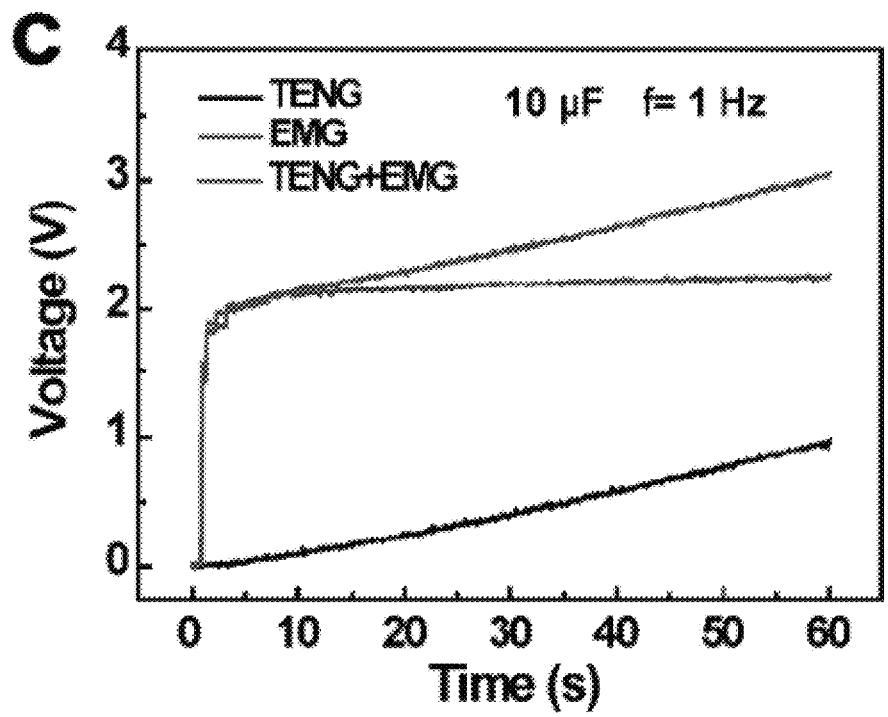
Figure 5D:
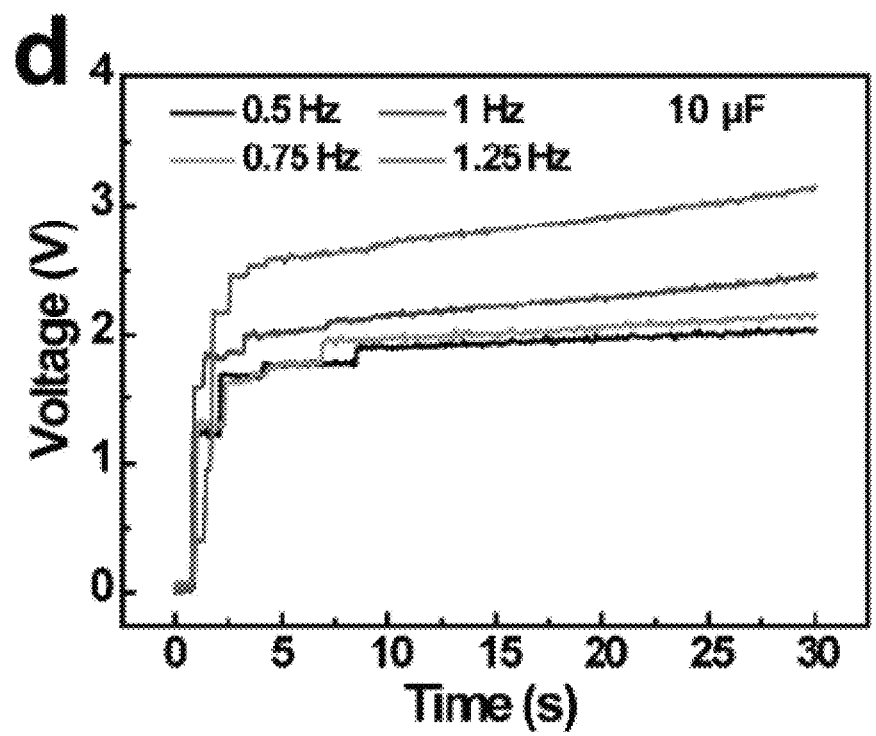
Figure 5E:
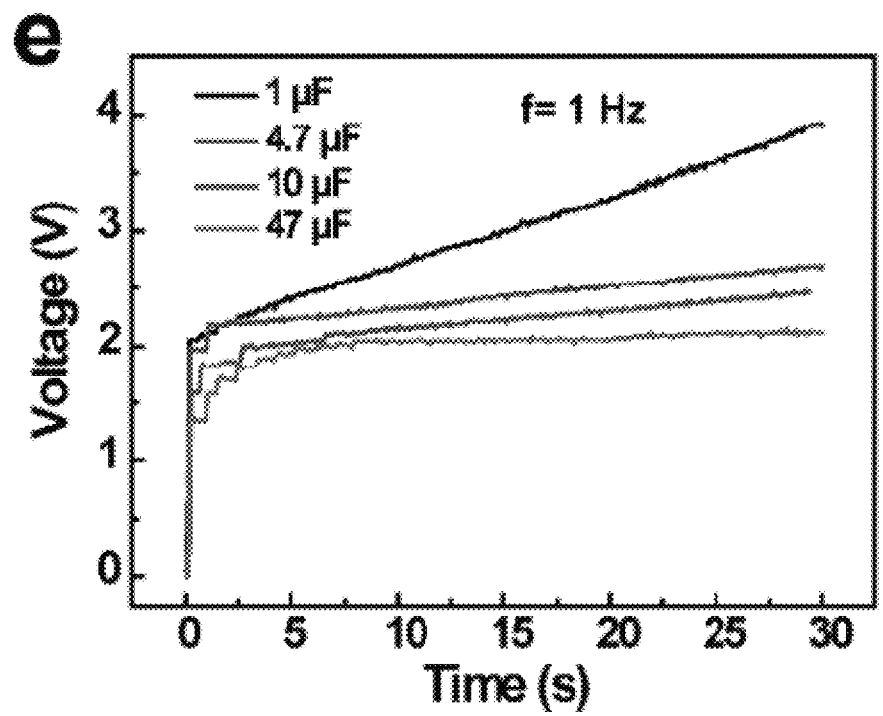

Furthermore, the output performance of the TEHG can be further enhanced by optimizing the structural design and proper material selection. FIG. 5C exhibits the charging voltage curves of a capacitor (10 μF) using an SB-TENG, an EMG, and a TEHG at a fixed charging time of 60 s and a working frequency of 1.0 Hz. Due to the relatively low output power and current, the charging rate of the SB-TENG is lower than that of the EMG. As for the EMG, the charging voltage quickly reaches about 2.1 V, and after that, the charging voltage increases slowly because of the low output voltage of EMG. By combining the advantages of the two parts, TEHG shows a much faster charging rate and a higher charging voltage than the individual energy-harvesting unit SB-TENG or EMG. FIG. 5D shows the charging voltage curves of a 10 μF capacitor by a TEHG under different frequencies. With the working frequency increasing, more energy can be harvested, and a higher charging voltage can be achieved. Moreover, as shown in FIG. 5E, a TEHG can charge a smaller capacitor to reach a higher voltage at a faster charging rate during the same charging time.

Figure 5F:
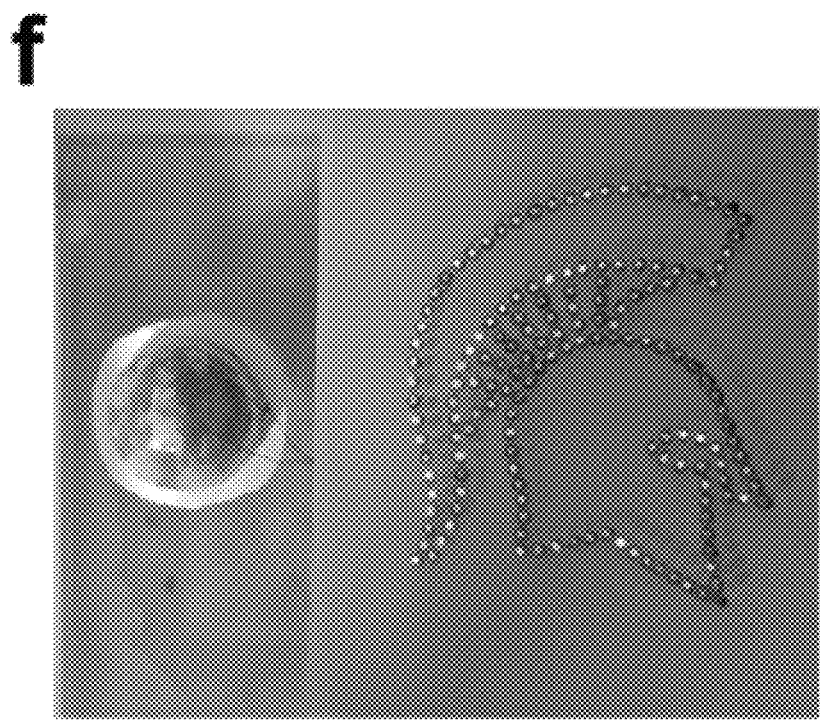
Figure 5G:
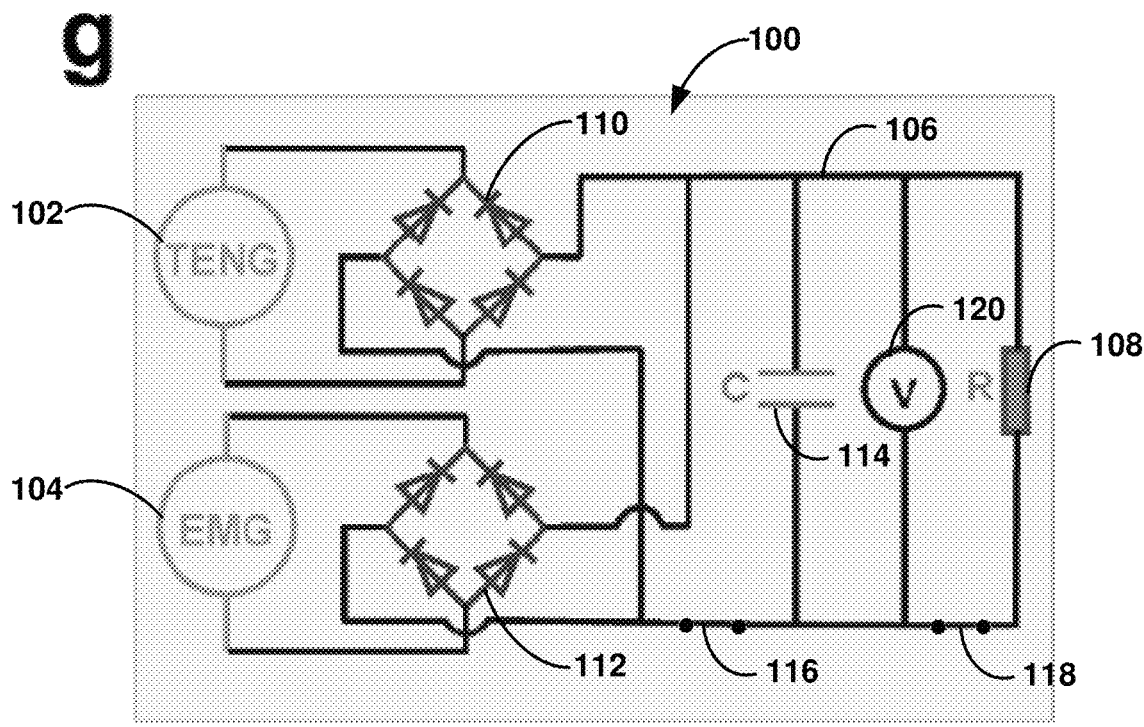

FIG. 5G show schematic diagrams for circuit 100 of a self-powered WEC system, which includes a TENG 102, EMG 104, conductors 106, a resister 108, a first rectifier 110, a second rectifier 112, a storage capacitor 114, and two switches 116 and 118. Conductors 106 may be insulated wires, stamped metallic conductors, printed circuit traces, or the like. The first rectifier 110 and second rectifier 112 are used to convert alternating current (AC) electricity to direct current (DC) electricity. The working mechanism for this circuit is: first, when switch 116 is on and 118 is off, storage capacitor 114 is charged by the TENG 102 and EMG 104 and their voltage is monitored by a voltmeter 120. Then, when the voltage is charged to a specific value, switch 118 is turned on and the stored energy is discharged to drive a connected electronic device.

It is envisioned that for charging voltages of a capacitor as a function of the charging time under different frequencies, the charging rate is expected to increase with the frequency, and more energy should be harvested with a higher frequency. The smaller the capacitor, the higher the charging voltage and the faster the charging speed.

In some embodiments, the TEHG can include or be electrically connected to at least one electrical component. The electrical component can include, for example, a sensor, a light, a timer, a display, a power storage unit, or a transmission unit that is part of or electrically connected to the TEHG. For example, a plurality of TEHGs can be included in a wave energy converter (WEC) system wherein each of the plurality of TEHGs are electrically connected to an electrical component at least one of a sensor, a light, a timer, display, a power storage unit, or a transmission unit. The TEHGs of the WEC system can float on top of and/or are partially or fully submerged in the water, and are moored to a floor by cables and an anchor block. Electrical lines can connect adjacent TEHGs and to a power storage or transmission unit.

The invention is further illustrated by the following example, which is not intended to limit the scope of the claims.

EXAMPLE

In this example, we describe a triboelectric-electromagnetic hybrid nanogenerator (TEHG) based on soft balls to convert mechanical energy into electricity. As a proof-of-concept, three layers of soft ball-based triboelectric nanogenerator (SB-TENG) units and an electromagnetic generator (EMG) unit are integrated into a spherical acrylic shell (FIG. 1). For the TENG part, liquid/silicon soft balls were used to replace the traditional hard triboelectric material as the moving triboelectric layer that can significantly increase the contact area to generate much more triboelectric charges. The EMG part composed of a magnet and copper coils is placed at the bottom of the device. Under the agitation of water waves, the soft balls and the magnet can simultaneously move back and forth in the shell. Thus, the water wave motions are converted into electricity. The key parameters that affect the energy harvesting performance of the TEHG were investigated, including the type of the liquid core materials, the thickness of the silicone rubber shell, and the number of layers of the soft balls. The output performance of the SB-TENG and EMG were studied under various mechanical triggering conditions. We finally demonstrate that the new TEHG can light dozens of light-emitting diodes (LED) and power a digital temperature meter for environment monitoring.

Experimental Section

Fabrication of the Soft Balls

Figure 8:
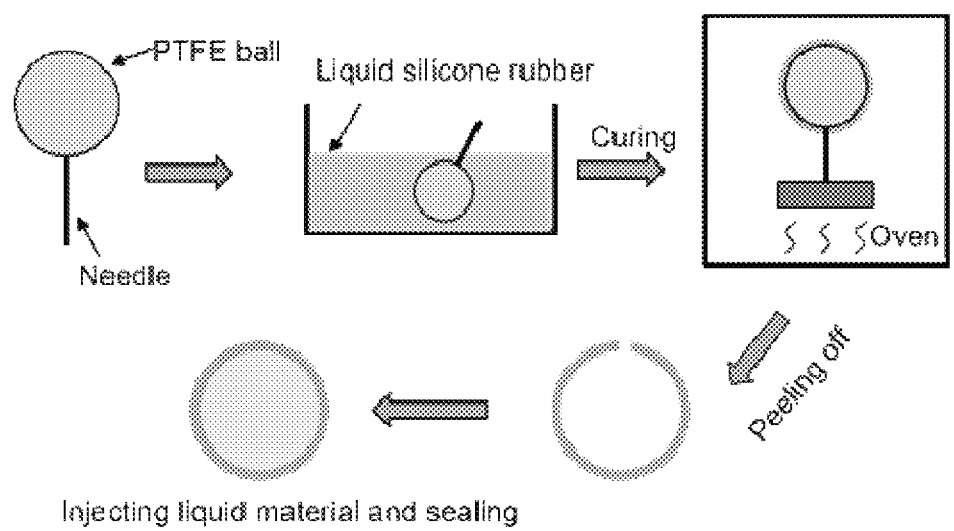
FIG. 8 is a schematic diagram of the preparation process of the soft ball.

The silicone rubber (Exoflex 00-30, Smooth-On, Inc.) was prepared by mixing the silicone base and precursor (Parts A and B) with a weight ratio of 1:1. As shown in FIG. 8, a PTFE ball with a diameter of 12 mm was utilized as a mold and a fine needle was inserted into the PTFE ball. We dipped the PTFE ball into liquid silicone rubber and then placed it in an oven at 80° C. for 2 hours. After that, the silicone shell was peeled off from the PTFE ball.

Finally, we injected liquid materials into the soft silicone shell through a small hole and sealed it with mixed silicone rubber. The sealed soft balls were placed in the oven for another 1 h for further use.

Fabrication of the TEHG

The circular PLA sheets are made as substrates by a 3D printer with the same thickness (1.5 mm). Two flat Cu conductive tapes are bonded onto the surface of the PLA sheets with a gap of ~1 mm and connected with lead wires. Finally, the EMG, the soft ball, and the PLA sheets are integrated into an acrylic spherical shell with a diameter of 12 cm, as shown in FIG. 1A.

Electrical Measurements of the TEHG

The open-circuit output voltage, short-circuit current and transferred charges of the SB-TENGs, the EMGs, and the TEHGs were measured by a current preamplifier (Keithley 6514 System Electrometer). A linear motor (LinMot MBT-37-120) was applied to drive the TEHG in the air and generate the water wave in a water tank. The software LabVIEW was programmed to acquire real-time control and data. All measured data were processed with MATLAB and Origin.

Results

Design and Working Principle of the TEHG

FIG. 1A illustrates the structural design of the TEHG, which consists of two major parts: multilayered soft ball-based TENG and EMG. As a proof-of-concept, we fabricate a three-layers TENG unit by filling different numbers of soft balls (FIG. 1B) into the cavity spaces between the adjacent circular polylactic acid (PLA) sheets. The circular PLA sheets are made as substrates by a 3D printer with the same thickness but different diameters. Two flat Cu conductive tapes are bonded onto the surface of the PLA sheets as the fixed triboelectric layers and conductive electrodes. The two electrodes are separated with a gap of ~1 mm (FIG. 1A). The soft balls made of silicone rubber (Ecoflex-30) have a diameter of ~12 mm, and they can deform when pressed with a small force (FIG. 1C). The soft ball has an internal cavity for filling liquid in so that the soft ball can generate more considerable deformation and contact area to improve the electricity generation of the TENG. The Ecoflex shell will be a negative tribo-material to form a pair with the copper layer. The detailed fabrication process of the soft ball can be found in the Experimental Section. To better observe the deformation and motion of the balls, we add a small amount of blue dye to the silicone rubber. Additionally, a copper coil with a circular pattern is embedded at the bottom of the acrylic shell, which has a dimension of Ø45 mm×5 mm. A circular magnet with a diameter of 20 mm is placed on top of the bottom PLA sheet. This coil-magnet structure forms an EMG, which has the function of wave energy harvesting and lowers the device's center of gravity to prevent possible overturning. An acrylic sphere with a diameter of 120 mm is used as a shell and sealed well with waterproof glue to avoid potential water leakage, which may affect the generator's energy harvesting performance.

FIG. 1D shows the working principle of the TENG unit, which is based on the conjugation of triboelectrification and electrostatic induction. When actuated by small wave agitations, the soft balls in the cavities of the device will freely move or roll back and forth between the two Cu electrodes, resulting in an alternating current in the external circuit. In brief, at the initial state (FIG. 1D <II>), when the soft balls are in contact with the left-hand Cu electrode, the soft balls are negatively charged. In contrast, the Cu electrode has the same number of positive charges in the saturated state due to its different abilities to attract electrons. At this moment, the tribo-charges will remain on the surfaces of the two triboelectric layers for an extended period. When the soft balls roll to the right-hand Cu electrode under the wave agitations, the equilibration of the electric field will be changed so that the free electrons flow from the right-hand electrode to the left-hand electrode, resulting in a forward current in the external load (FIG. 1D <II>). When the soft balls leave the left-hand electrode and contact the right-hand electrode, all the positive charges on the left-hand electrode will be driven to the right-hand electrode (FIG. 1D <III>). After that, the soft balls will move back to their original positions, and the free electrons flow back to the right-hand electrode, generating a reverse current in the external load (FIG. 1D <IV>). FIG. 1E illustrates the working mechanism of the EMG unit, which is based on electromagnetic induction. Under the wave agitation, the magnet slides right-left with the coil so that the coils cut magnetic induction lines, inducting an electromagnetic current. With the cyclic motions of the magnet, alternating electricity will be generated continuously in the coil.

Effect of the Materials and Structural Design on the Energy Harvesting Performance of SB-TENG To make the soft balls highly elastic and flexible, we use silicone rubber to fabricate the ball's shells. The soft balls are expected to have a larger effective contact area with the electrodes to enhance the output performance of the TENG. However, it is found that the soft balls made of silicone rubber become sticky and generate a relatively large damping force at the interface, thus dramatically hindering the motions of the soft balls under the small agitations. Therefore, we stick polytetrafluoroethylene (PTFE) powders on the surface of the soft balls to reduce the damping force but simultaneously enhance contact electrification. As shown in FIG. 3A, the soft balls with PTFE powders are less sticky and can roll off fast on an inclined Cu surface.

Figure 3B:
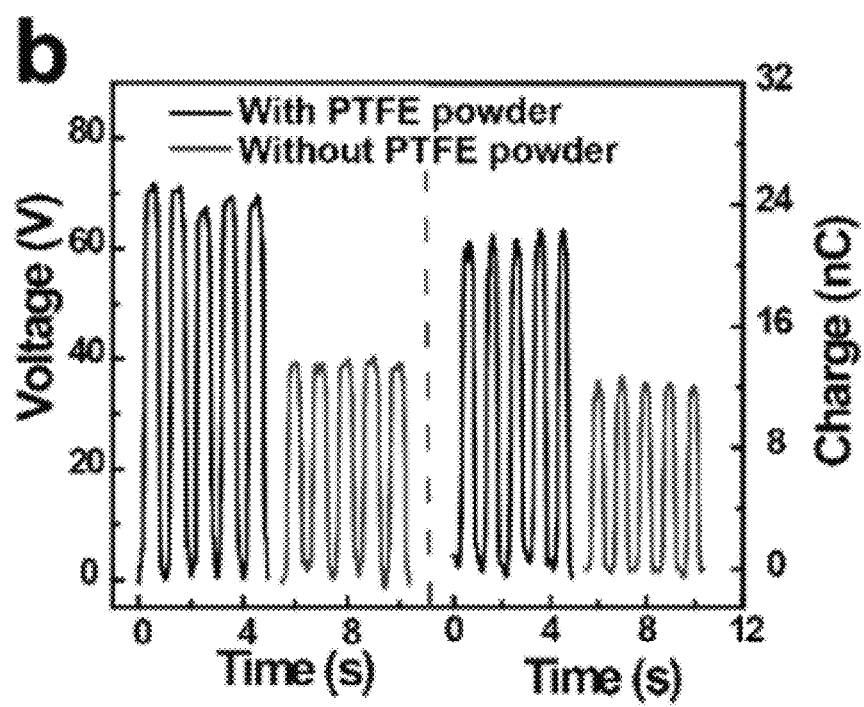

In contrast, the soft balls without PTFE powders are very sticky, and the large damping force prevents it roll off from the inclined Cu surface. It should be noted that the PTFE powders are adsorbed on the surface of the soft balls relying on the highly sticky silicone rubber. We also added PTFE powders to the silicon rubber solution to obtain the composite material. However, it is found that this method has only a minimal effect on reducing the damping force and the higher content of PTFE powders decreases the flexibility of the soft ball. It is well known that PTFE is one of the most widely used triboelectric materials because of its high negativity in the triboelectric series. FIG. 3B demonstrates that the TENG made of soft balls with PTFE powders can generate better output performance than that without PTFE powders under the same external agitations, attributing to the high tribo-negativity of PTFE.

Figure 3C:
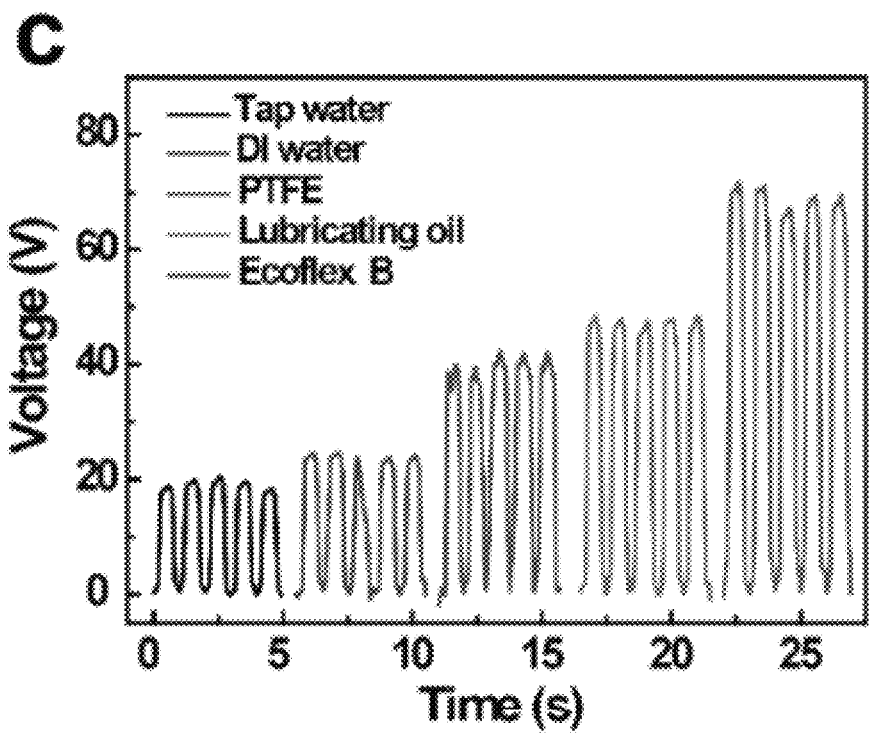
Figure 3D:
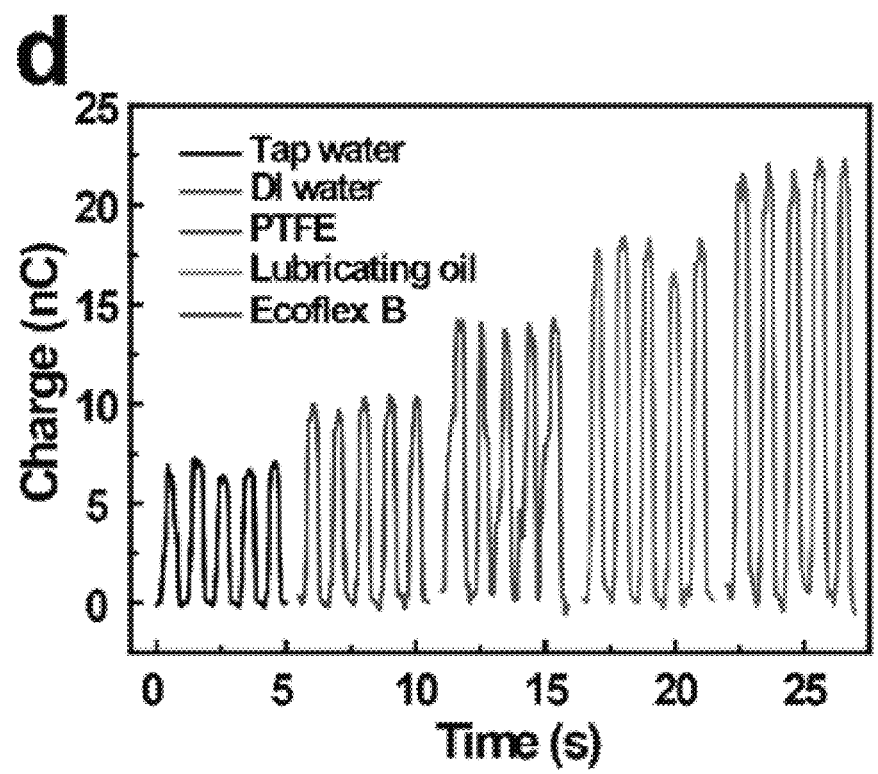

Additionally, we examine the effect of liquid materials on the output performance of the SB-TENG. We inject a few kinds of liquids: tap water, deionized (DI) water, lubricating oil, and Ecoflex B, into the soft shell to compare the TENG's performance. The output performance of a TENG made of rigid PTFE balls is also studied for comparison. FIGS. 3C and 3D present the influences of liquid type on the open-circuit voltage and short-circuit transferred charge of the SB-TENGs. It is obvious that the SB-TENGs filled with lubricating oil and Ecoflex B exhibit much higher output performance than those made of rigid PTFE balls. The SB-TENGs with Ecoflex B can generate a peak value of 70 V and 22 nC, respectively.

Figure 3E:
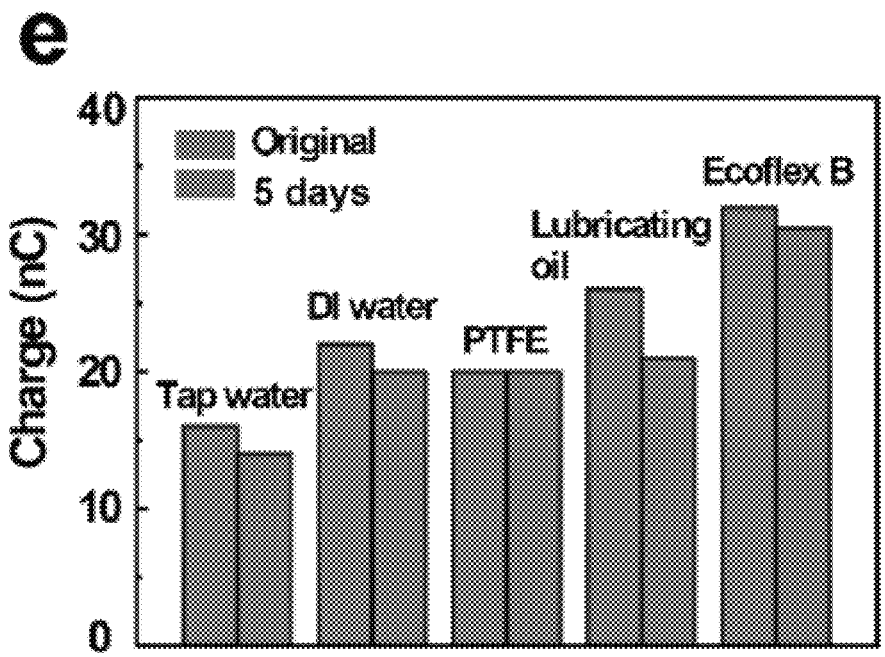
Figure 6:
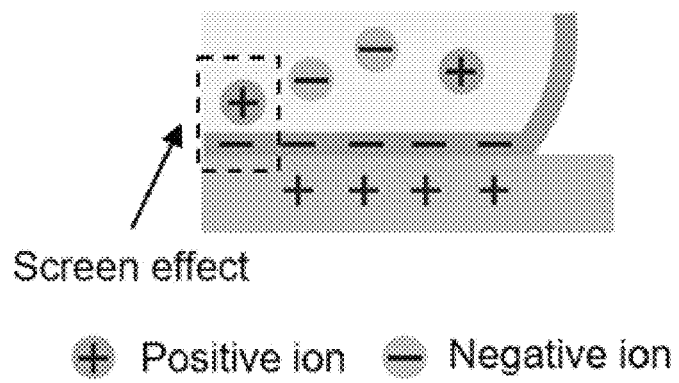
FIG. 6 is a schematic diagram of the screen effect of ions in water.

On the other hand, the SB-TENGs with tap water and DI water have a significantly lower output performance, about 30% or less of those made with Ecoflex B. The lower performance may be due to the screen effect of ions or charges in the water. As shown in FIG. 6, the positive ions in the water can attract negative charges on the Ecoflex, which can interfere with the generation of contact electrification charges on the Cu electrode. Unlike water, Ecoflex B and lubricating oil are liquid polymers without free ions so that they wouldn't affect the contact electrification charge amount on the Cu electrode. To check the stability of the device, we test the short-circuit transferred charges of SB-TENGs made with different liquids at different times (0 h and five days) after fabrication. The test was conducted under the same testing conditions, and the number of samples increased to six. It can be seen from FIG. 3E that the SB-TENGs made with lubricating oil have a considerable degradation of the output performance compared to those made with DI water, tap water, and Ecoflex B. The samples with Ecoflex B demonstrated little change after five days. This phenomenon may be attributed to the silicone rubber's low oil resistance and the oil's resultant leakage, especially when the thickness of the silicone rubber shell is skinny. Thus, in the following experiments, we will choose Ecoflex B as the filled liquid for new SB-TENGs.

Figure 3F:
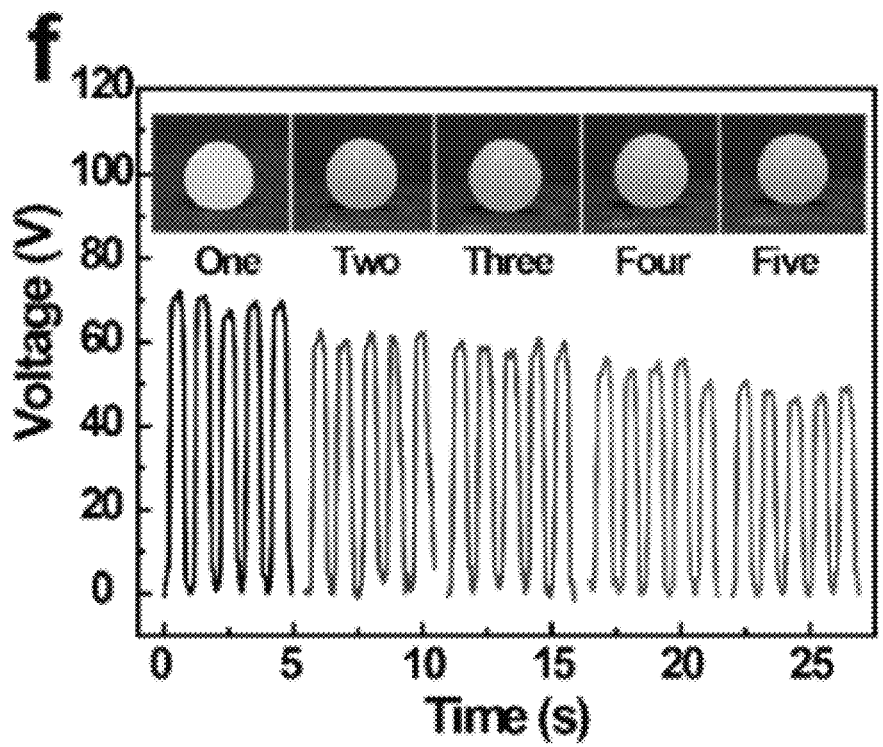

In addition, we also investigate the influence of the shell thickness of the soft balls. As shown in FIG. 3F, five different kinds of soft balls are made with different thicknesses by increasing the coating-curing times. It is observed that the output voltage of the SB-TENG decreases with the thickness of the silicone rubber shell. This difference should be due to the smaller contact area between the soft ball with a thicker shell and the electrodes. Although the thickness of the soft shell can be further reduced by adjusting the mixed ratio of the Ecoflex 30, its robustness will decrease, and the damping force will increase significantly.

Figure 3G:
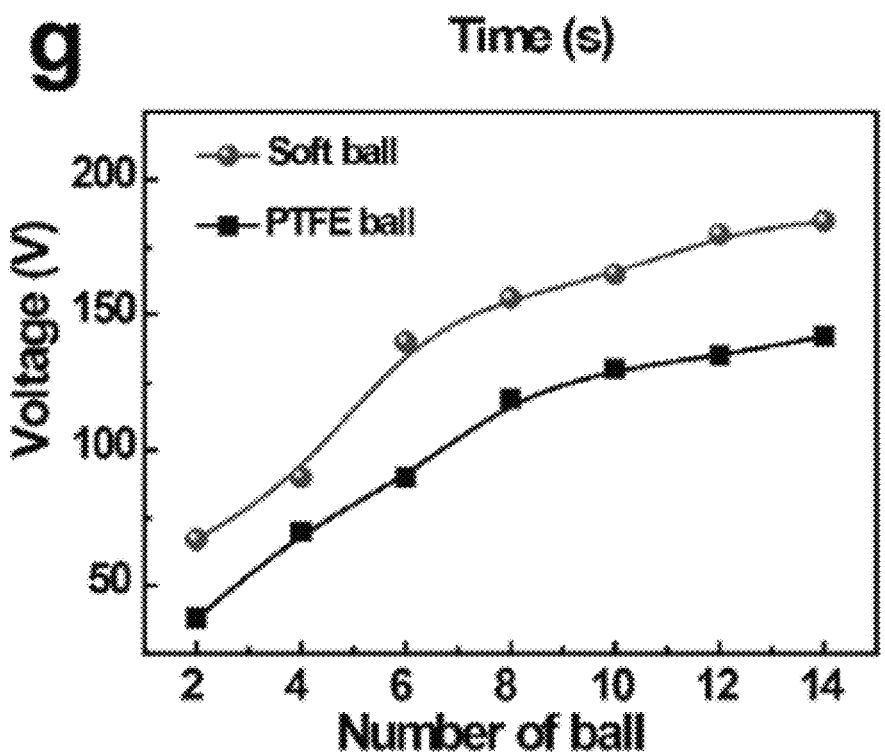
Figure 3H:
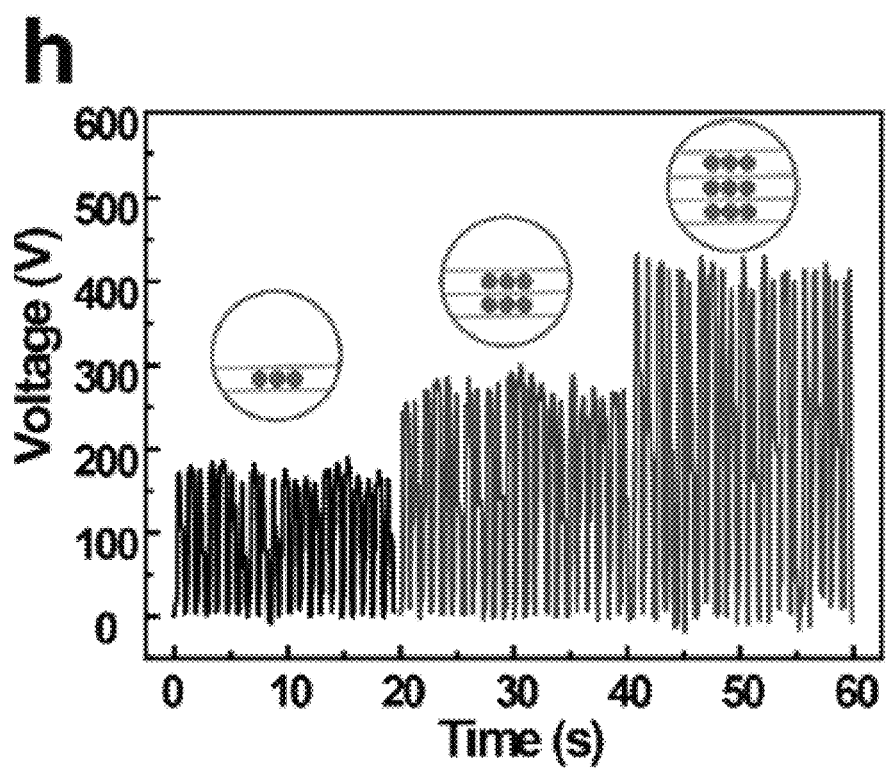

We further compare the output performance of the SB-TENGs made of soft balls and PTFE balls. As shown in FIG. 3G, the output performances of two kinds of TENGs have a similar increasing trend with the number of moving balls in the cavities. However, the increasing rate becomes smaller with more moving balls in the cavities. This change is attributed to the larger damping force and the smaller moving space in the device when having more balls. It can be found that the output voltage of the SB-TENG has been significantly improved compared to that of the rigid PTFE ball-based TENG. FIG. 3H presents the output voltages of SB-TENGs with a different number of layers. Three layers can be integrated into the limited space of the SB-TENG unit. The measured output voltage of an SB-TENG with a single layer is around 180 V, and it can be enhanced to 430 V when having three layers in the device. This result indicates that a multilayered design can fully use the limited space in the device and significantly improve the output performance of the TENG.

Figure 4A:
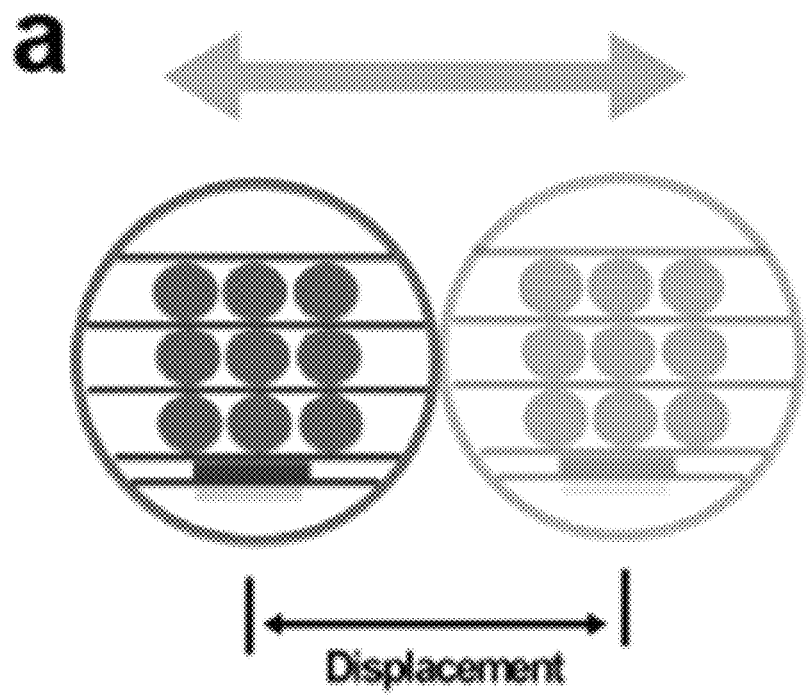
FIGS. 4(A-J) illustrate energy harvesting performance of the TEHG under different excitation conditions. (A) Schematic diagram of the translational mode. (B) Output voltage of the SB-TENG and (C) Output voltage of the EMG under different excitation frequencies. (D) Output voltage of the SB-TENG and (E) Output voltage of the EMG under different translational amplitudes. (F) Schematic diagram of the swing mode. (G) Output voltage of the SB-TENG and (H) Output voltage of the EMG under different swing frequencies. (I) Output voltage of the SB-TENG and (J) Output voltage of the EMG under different orientation angles.
Figure 4B:
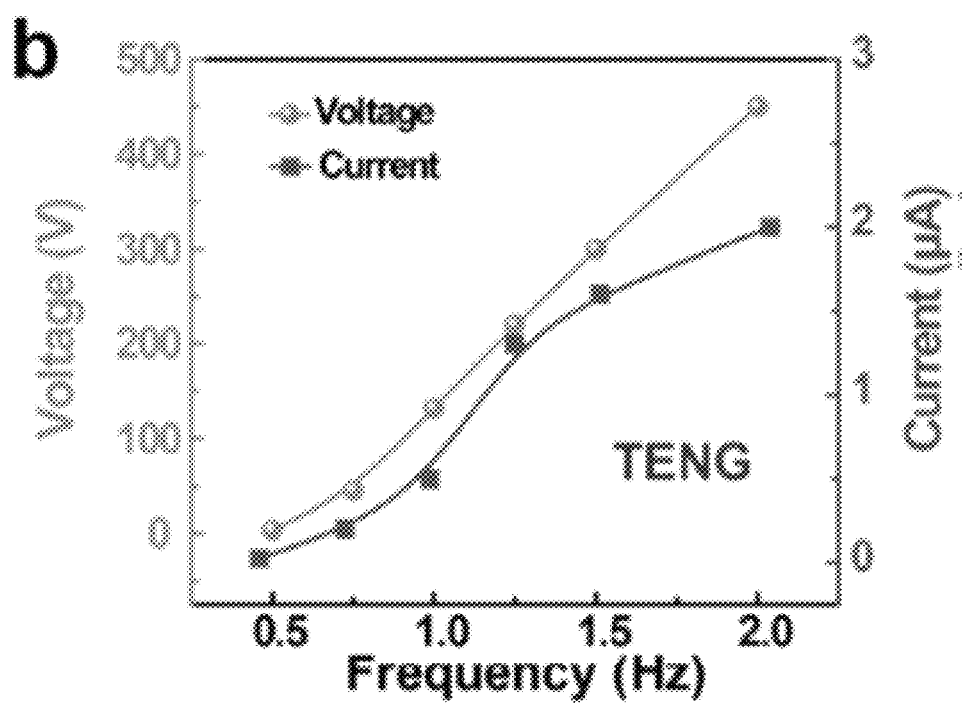
Figure 4C:
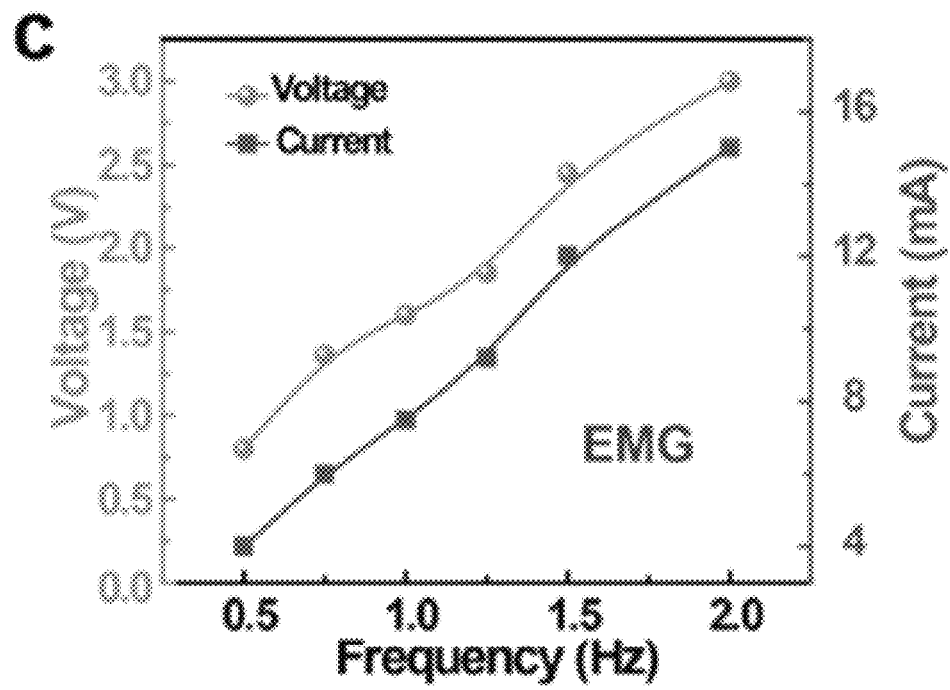
Figure 4D:
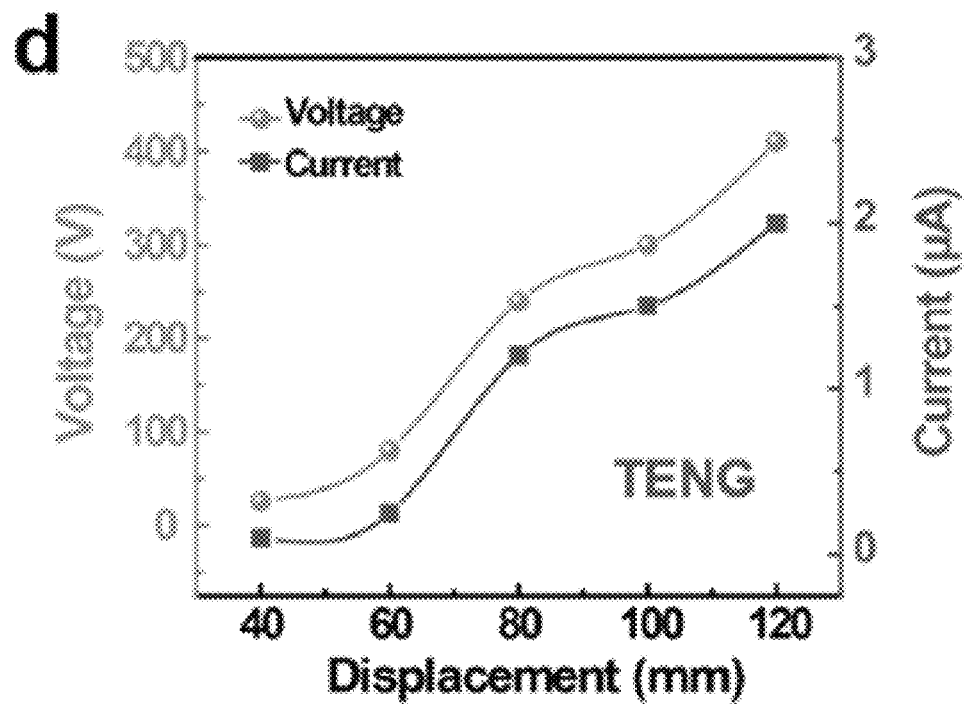
Figure 4E:
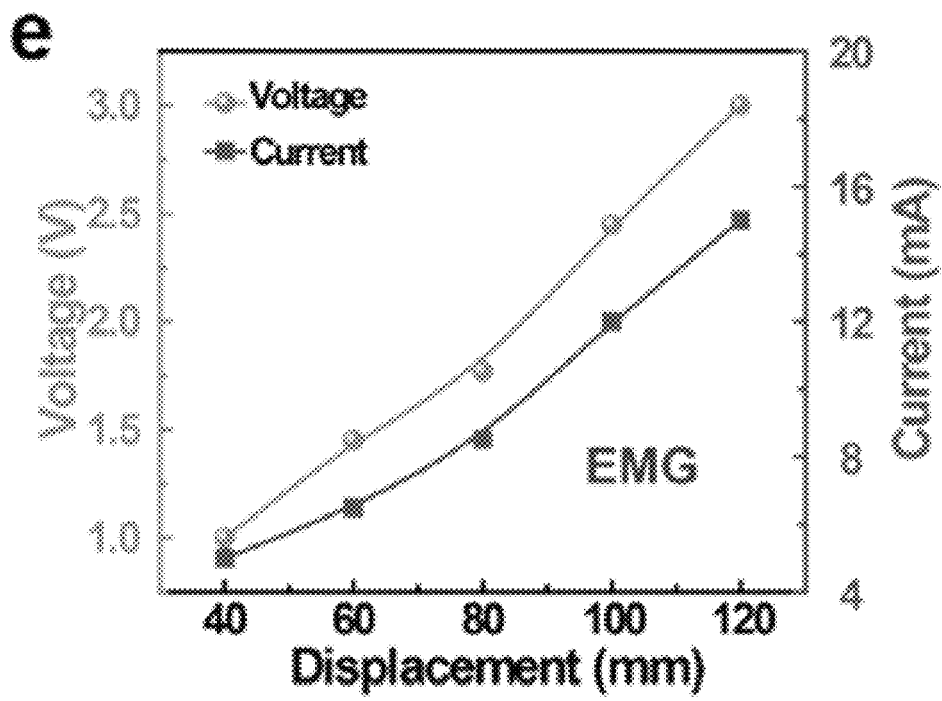
Figure 4F:
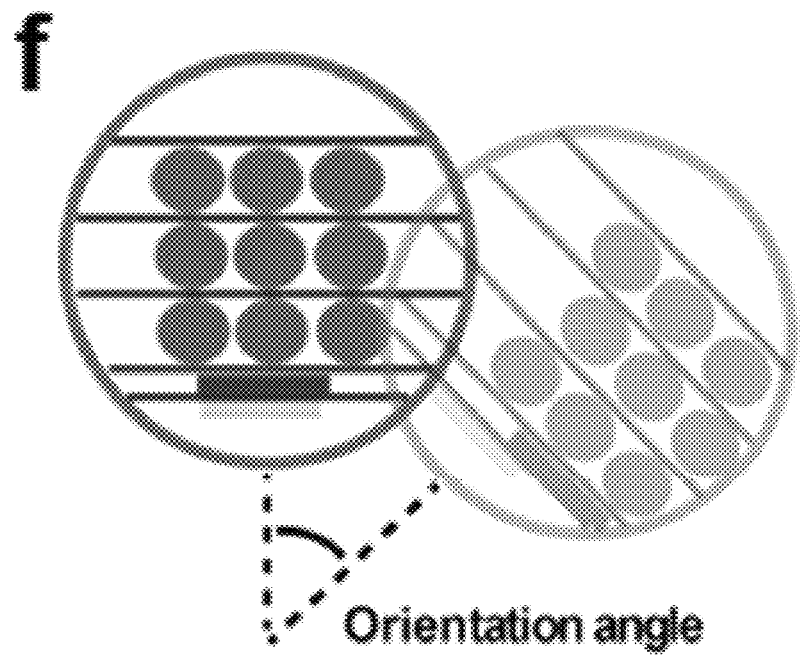

Effect of the Excitation Mode and Conditions on the Energy Harvesting Performance of TEHG Water waves in the ocean are very complex and may constantly change due to the uncertainty associated with many factors, such as wind, gravity, and planetary motion. To characterize the energy harvesting performance of the TEHG under different wave excitation conditions, we have categorized the motions into two basic movement modes, namely the translational mode and the swing mode (FIGS. 4A and 4F). A linear motor is used to simulate the two movement modes with assigned acceleration, speed, and displacement amplitude. The TEHG device is attached to a platform fixed on the linear motor for the translational mode to apply the vibration. With the excitation frequency varies from 0.5 Hz to 2 Hz, the peak values of the output voltage and current generated by the SB-TENG increase to 450 V and 2 µA, respectively (FIG. 4B). The output voltage and current of the EMG have a similar variation trend, in which the voltage monotonically increases from 0.8 V to 3 V and the current rises from 4 mA to 15 mA as the frequency increases from 0.5 Hz to 2 Hz (FIG. 4C). These results are in consistence with the Faraday's law, i.e., the voltage and current of the EMG are positively correlated with the moving velocity of the magnet. FIGS. 4D and 4E show the effect of translational amplitude of the excitation on the output performance of TEHG. The output voltages and currents of the SB-TENG and the EMG are proportional to the translational amplitude at a frequency of 1.5 Hz. This variation should originate from the higher inertial acceleration of the soft balls and the magnet induced by the larger translational amplitude. Remarkably, less kinetic energy can be transferred to the soft balls and the magnet for a smaller translational amplitude and a lower frequency, thereby generating a much smaller electric output.

Figure 4G:
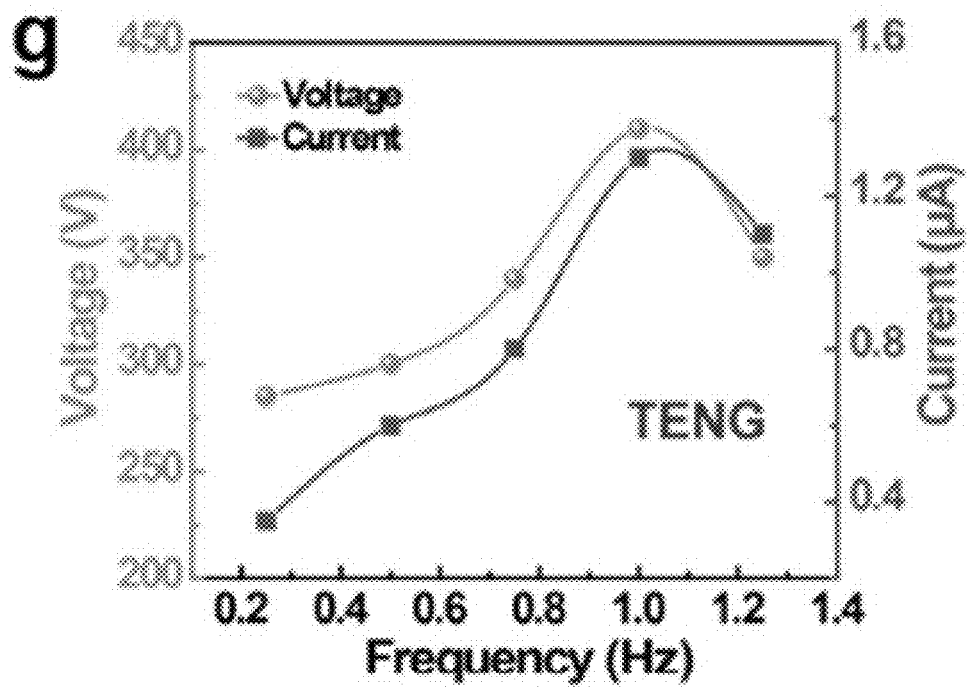
Figure 4H:
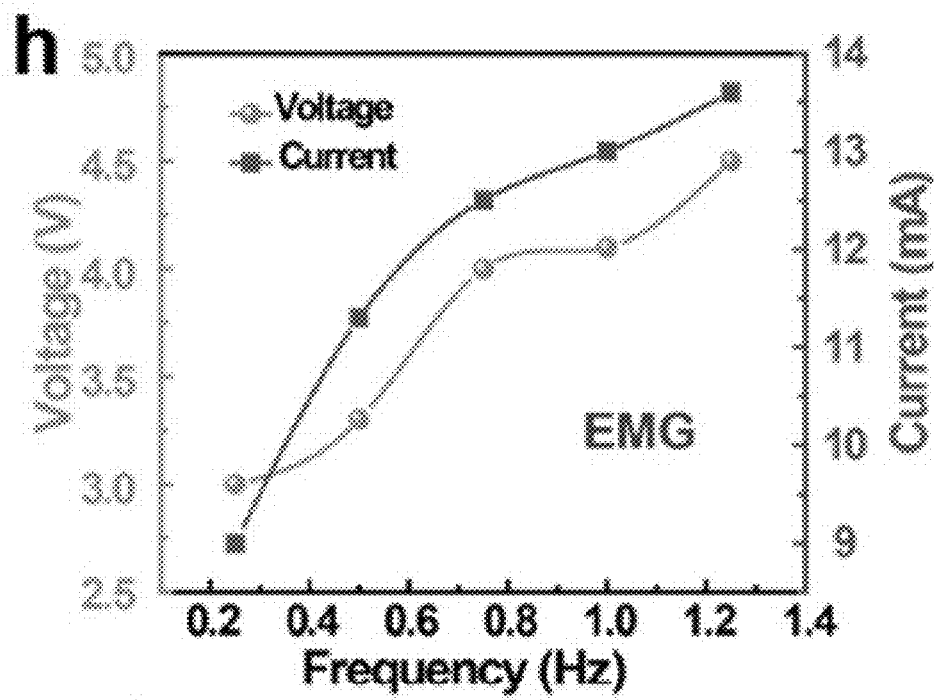

For the swing mode, as shown in FIG. 4G, the peak output voltage and current of the SB-TENG at an orientation angle of 45° increase rapidly with the increasing swing frequency, from 285 V and 0.35 µA at 0.25 Hz to 410 V and 1.3 µA at 1.0 Hz, and then decrease at higher frequencies (>1.0 Hz). The initial increasing stage is attributed to the increased moving speed of the soft balls. However, when the swing frequency is higher than 1.0 Hz, the soft balls oscillate unstably to generate more collisions among the moving balls, resulting in uncompleted travels between the two Cu electrodes. On the other hand, the output performance of the EMG monotonically increases with the swing frequency (FIG. 3H) due to the larger movement space and lower frictional force.

Figure 4I:
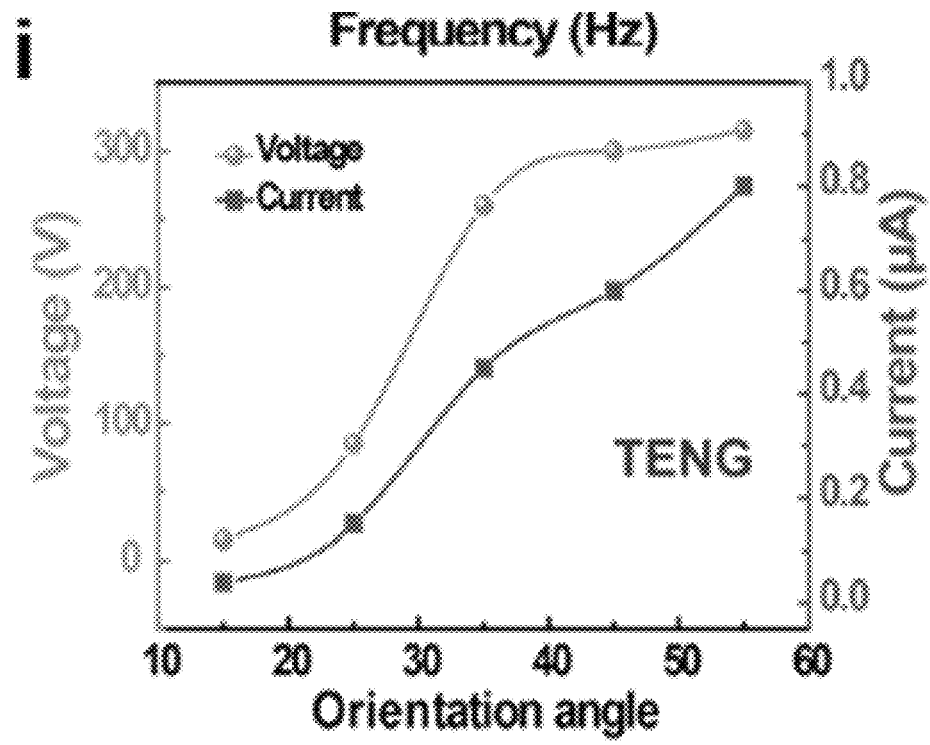
Figure 4J:
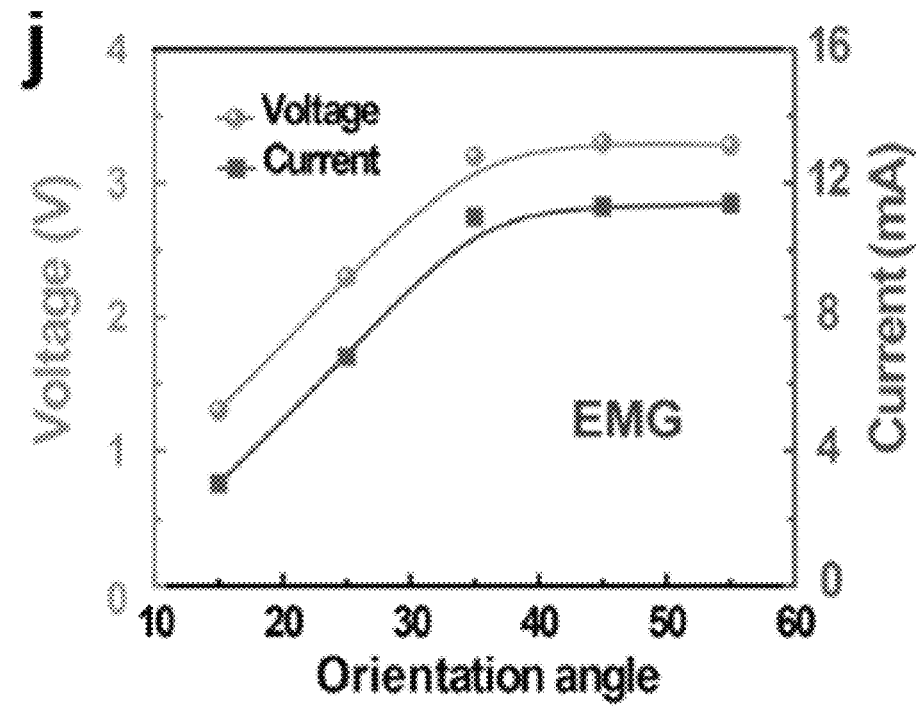

FIGS. 4I and 4J show the TEHG's output performance variation with the orientation angle. Five different orientation angles, from 15° to 55°, were controlled under a constant swing frequency of 0.5 Hz. The output voltage and current of the SB-TENG gradually increase with the orientation angle, which is attributed to the more significant moving displacement of the soft balls under a larger orientation angle. The output voltage and current of the EMG first increase with the orientation angle increasing from 15° to 35° because the larger orientation angle generates a more significant moving displacement and a faster-moving speed of the magnet. However, when the orientation angle increases from 35° to 55°, the output performance of the EMG is kept nearly as constant due to the constraint of the shell on the continuous increase of the moving displacement and the magnet speed.

Evaluation of the New TEHG and Self-Powered Systems

Figure 7:
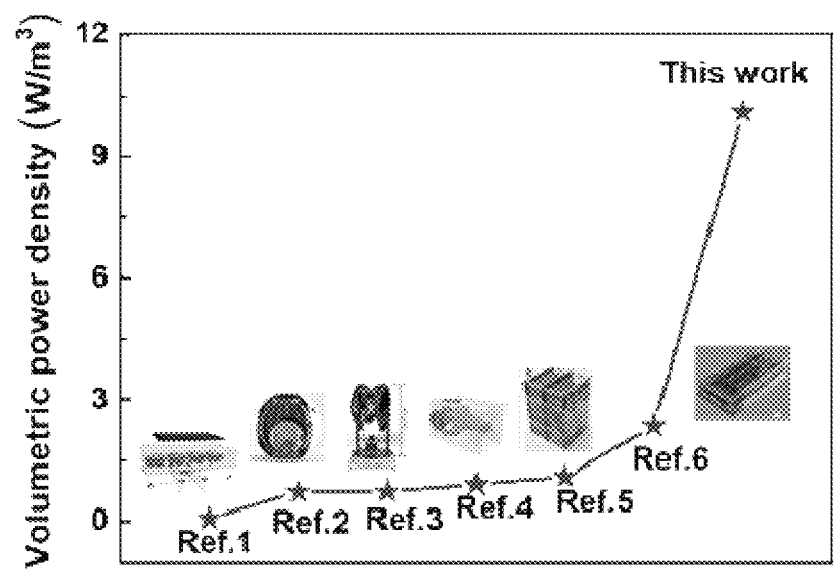
FIG. 7 illustrates a comparison of volume power density between this work and other triboelectric-electromagnetic hybrid nanogenerators.

The energy harvesting performance of TENGs is dependent on the external resistor loading. To optimize the energy harvesting performance, we have to investigate the impedance of the SB-TENG and the EMG. As shown in FIGS. 5A and 5B, the output voltages of the SB-TENG and the EMG increase with the increasing resistance loads while the output currents exhibit a reverse trend. It is found that when the external resistance is 700 MΩ, the SB-TENG reaches a peak power of 0.5 mW, while the EMG has a peak power of 8.6 mW at a load resistance of 180Ω. The above results indicate that SB-TENG can be regarded as a current source with a high impedance, whereas the EMG is equal to a voltage source with a low impedance. According to the total volume of the device, the volumetric power density of the TEHG was calculated to be 10.1 $Wm^{-3}$. As shown in FIG. 7, we list the volumetric power density of several triboelectric-electromagnetic hybrid nanogenerators from previous studies, and the TEHG exhibits the highest volumetric charge density.

Furthermore, the output performance of our device could be further enhanced by optimizing the structural design and proper material selection. FIG. 5C exhibits the charging voltage curves of a capacitor (10 µF) using an SB-TENG, an EMG, and a TEHG at a fixed charging time of 60 s and a working frequency of 1.0 Hz. Due to the relatively low output power and current, the charging rate of the SB-TENG is lower than that of the EMG. As for the EMG, the charging voltage quickly reaches about 2.1 V, and after that, the charging voltage increases slowly because of the low output voltage of EMG. By combining the advantages of the two parts. TEHG shows a much faster charging rate and a higher charging voltage than the individual energy-harvesting unit SB-TENG or EMG. FIG. 5D shows the charging voltage curves of a 10 µF capacitor by a TEHG under different frequencies. With the working frequency increasing, more energy can be harvested, and a higher charging voltage can be achieved. We also test the TEHG to charge different capacitors at the frequency of 1.0 Hz. As shown in FIG. 5E, a TEHG can charge a smaller capacitor to reach a higher voltage at a faster charging rate during the same charging time.

Figure 5H:
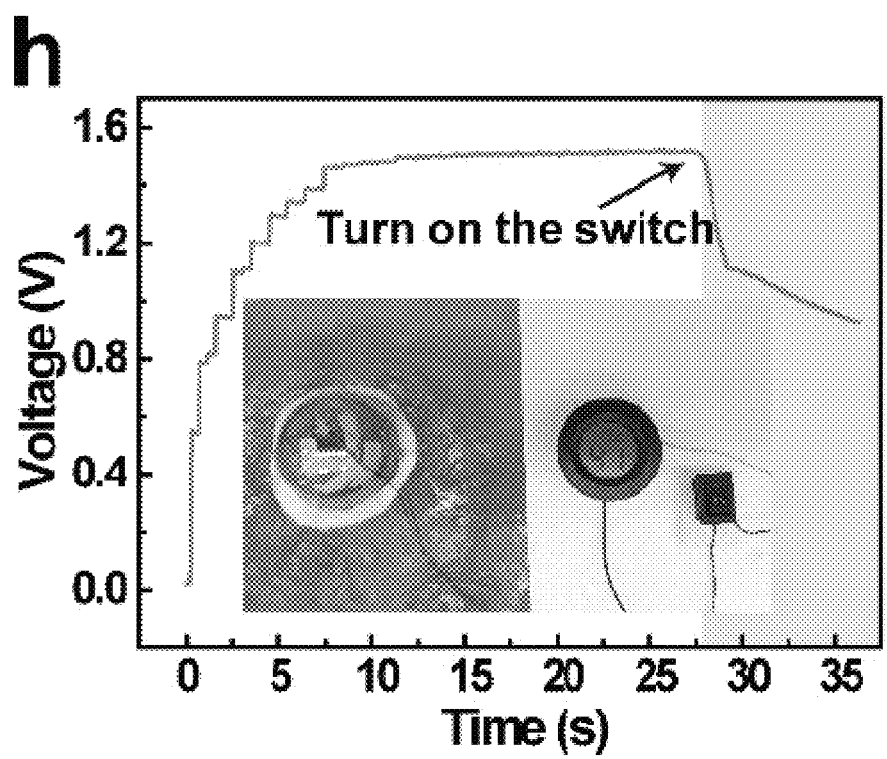

We place the TEHG device into a water tank to demonstrate its great potential in harvesting water wave energy (FIG. 5F). Under the excitation of water waves, the TEHG can lighten dozens of light-emitting diodes (LEDs). We can integrate the TEHG with a rectifier, a storage capacitor, and two switches to form a self-powered electronics system, which can be used to power a sensor for long-term service (FIG. 5G). The TEHG can charge a capacitor (100 µF) in less than 10 s by harvesting water wave energy (FIG. 5H). When the charging voltage reaches ~1.5 V, the thermometer powered by the capacitor is activated to measure the water temperature. After discharging, the TENG can continue to charge it to the working voltage of 1.5 V to power the sensor to work again.

We have proposed a new triboelectric-electromagnetic hybrid nanogenerator for water wave energy harvesting. The soft balls were designed as the moving triboelectric layer to increase the contact area. At the same time, a multilayered structure was adopted to fill more soft balls to utilize the device space fully. The energy harvesting performances of the SB-TENG and the EMG were investigated under different mechanical excitation conditions and configurations. With the optimal design, the SB-TENG and the EMG achieved a maximum output peak power of 0.5 mW and 8.5 mW, respectively, under an operating frequency of 1.0 Hz. Finally, we demonstrated a TEHG-based self-powered electronic system to drive a digital temperature sensor to measure the water temperature. This new design provides an innovative and promising approach to effectively harvesting low-frequency water wave energy in the ocean for marine monitoring and electricity generation.

From the above description of the invention, those skilled in the art will perceive improvements, changes and modifications. Such improvements, changes and modifications within the skill of the art are intended to be covered by the appended claims. All references, publications, and patents cited in the present application are herein incorporated by reference in their entirety.

Having described the invention, we claim:

1. A triboelectric-electromagnetic hybrid nanogenerator (TEHG) comprising:
   a buoyant, waterproof and enclosed shell;
   a plurality of cavities within the shell defined by a plurality of substantially parallel dividers, the parallel dividers including an upper divider, a lower divider, and a plurality of middle dividers, each middle divider including a substantially planar upper surface, a substantially parallel lower surface and a set of spaced apart electrodes affixed to the upper surfaces of the middle dividers;
   a plurality of freely moveable chargers located on the upper surfaces of each middle divider;
   a conductive coil positioned below the lower divider on a bottom interior surface of the shell; and
   a freely moveable magnet positioned on an upper surface of lower divider; wherein the shell is configured to move due to exterior fluid movement to move the chargers between the separated electrodes and the magnet across the upper surface of the lower divider to generate, respectively, triboelectric and electromagnetic charging.

2. The TEHG of claim 1, wherein the chargers are negatively charged and the electrodes are positively charged and the movement of the chargers between separated electrodes on the middle dividers upon movement of the shell result in the generation of an alternating current.

3. The TEHG of claim 1, wherein upon movement of the shell, the magnet slides relative to the coil so that the coil cuts magnetic induction lines, inducing an electromagnetic current.

4. The TEHG of claim 1, wherein the chargers comprise moveable balls that are elastic and flexible to enhance contact with the electrodes.

5. The TEHG of claim 4, wherein each of the moveable balls includes an outer silicone shell and a liquid polymer within the outer silicone shell.

6. The generator of claim 4, wherein each of the moveable balls includes an outer surface that is coated with a polytetrafluoroethylene (PTFE) powder.

7. The generator of claim 1, wherein the enclosed shell is substantially spherical and the dividers are substantially circular in shape.

8. The generator of claim 1, further comprising at least one electrical component, the electrical component including a sensor, a light, a timer, or display.

9. A wave energy converter comprising a plurality of TEHGs of claim 1, wherein the plurality of TEHGs are electrically connected power storage or an energy transfer device.

* * * * *